(12) United States Patent
Malone

(10) Patent No.: US 10,175,470 B2
(45) Date of Patent: Jan. 8, 2019

(54) INTELLIGENT SELF-HEALING OF ELECTROWETTING DEVICES

(71) Applicant: ABL IP Holding LLC, Conyers, GA (US)

(72) Inventor: Gregory Malone, Herndon, VA (US)

(73) Assignee: ABL IP Holding LLC, Conyers, GA (US)

( * ) Notice: Subject to any disclaimer, the term of this patent is extended or adjusted under 35 U.S.C. 154(b) by 7 days.

(21) Appl. No.: 15/421,896

(22) Filed: Feb. 1, 2017

(65) Prior Publication Data

US 2018/0217370 A1 Aug. 2, 2018

(51) Int. Cl.
*G02B 26/00* (2006.01)
*G02B 26/08* (2006.01)
(Continued)

(52) U.S. Cl.
CPC ...... *G02B 26/005* (2013.01); *H02M 3/33507* (2013.01)

(58) Field of Classification Search
CPC ............ G01R 31/2601; G01R 31/2607; G01R 31/3025; G09G 3/00; G09G 3/006; H01L 22/14; H01L 27/1255; H02J 3/383; H02J 3/38; H02J 3/385; H02J 7/022; H02J 13/0024; H02J 2007/0096; H02J 3/46; H02J 7/045; H02J 2007/0001; H02J 7/00; H02J 7/0047; H02J 2007/0062; H02J 2007/0098; A61B 18/1492; A61B 2018/00214; A61B 2018/00577; A61B 2090/065; A61B 5/0422; A61B 18/12; A61B 18/1485; A61B 2017/00101; A61B 2017/003;

(Continued)

(56) References Cited

U.S. PATENT DOCUMENTS

2012/0154896 A1* 6/2012 Clapp .................. G02B 26/004
359/290
2012/0200939 A1* 8/2012 Kuiper ................. G02B 26/005
359/665

(Continued)

OTHER PUBLICATIONS

International Search and Written Opinion of the international Searching Authority for International Application No. PCT/US2018/016145, dated Apr. 24. 2018. 12 pages.

*Primary Examiner* — Brandi Thomas

(74) *Attorney, Agent, or Firm* — RatnerPrestia

(57) ABSTRACT

The disclosed examples relate to methods and systems facilitate self-healing of regions of electrowetting devices. Electrowetting devices may be coupled to a switchable AC/DC electrical power supply that provides AC power to the electrowetting device to control electrowetting device operation and DC power to promote self-healing of the electrowetting device. A monitoring circuit outputs a signal in response to electrical power supply operating characteristic changes due to a failure of the electrowetting device's dielectric. The controller, responding to the signal, switches the power supply output from AC power to DC power to the electrowetting device. In response to the DC power, the electrowetting device responds by healing the degraded dielectric. When the failure is determined to be corrected, the power supply output is switched from DC power to AC power to the electrowetting device. The number of times self-healing is applied may be tracked for future analysis.

22 Claims, 8 Drawing Sheets

(51) Int. Cl.
*G02F 1/29* (2006.01)
*H02M 3/335* (2006.01)

(58) Field of Classification Search
CPC  A61B 2018/00041; A61B 2018/00065; A61B 2018/00107
USPC ........... 359/237, 242, 265–267, 270–273, 359/290–292, 295, 298, 315, 321–324
See application file for complete search history.

(56) References Cited

U.S. PATENT DOCUMENTS

2015/0124311 A1  5/2015  Berge et al.
2016/0201699 A1  7/2016  Heikenfeld et al.

\* cited by examiner

400

600

700

INTELLIGENT SELF-HEALING OF ELECTROWETTING DEVICES

TECHNICAL FIELD

The disclosed subject matter relates to enabling a self-healing process of an electrowetting device. More specifically, the disclosed subject matter is related to monitoring an operating characteristic of a driver that provides electrical power to the electrowetting device for purposes of controlling the electrowetting device, and to implement a process to cure upon detecting a degraded component in the electrowetting device.

BACKGROUND

Electrowetting is a fluidic phenomenon that enables changing of the configuration of a contained fluid system in response to an applied voltage. Examples of electrowetting optics may use two immiscible fluids having different properties. For example, the two fluids have different indices of refraction. One fluid may be conductive. The other fluid, typically the fluid adjacent to a hydrophobic surface, may be non-conductive, such as an oil. The conductive fluid may be a transparent liquid, but the other fluid may be reflective, transparent, or transmissive with a color tint. Where both liquids are transparent or transmissive, the non-conductive fluid typically exhibits a higher index of refraction than the conductive fluid. An electrowetting device may be controlled by changing the applied electric field, which in turn, applies a force to the conductive liquid to change the shape of the fluid interface surface between the two liquids and thus the refraction of the light passing through the interface surface. If the interface surface is reflective (e.g. due to reflectivity of one of the liquids or inclusion of a reflector at the fluid interface), changing the applied electric field changes the shape of the reflective interface surface and thus the steering angle of the light reflected at the interface surface. Depending on the application for the electrowetting optic, the light may enter the fluid system to pass first through either one or the other of the two liquids.

As outlined above, an electrowetting optic often includes a layer or the like formed on a hydrophobic material. A hydrophobic material is a substance that is not attracted to a polar liquid such as water. A hydrophobic material or layer thus may appear to repel water. In the absence of another force, a drop of water on a surface of a hydrophobic material exhibits a high contact angle with respect to the surface. Examples of a hydrophobic material for electrowetting applications often also form an electrically insulating dielectric. In such an optic, the hydrophobic dielectric layer often extends across one or more electrode surfaces within the optic that otherwise would be exposed to at least one of the liquids. Even small failures of the hydrophobic dielectric layer may compromise operation of the electrowetting optic including a potentially catastrophic failure, such as rupturing of the electrowetting optic from the gas build up due to hydrolysis.

FIG. 1A illustrates a simplified electrowetting cell 100 as is known in the electrowetting arts. The simplified electrowetting cell 100 is an enclosed capsule (e.g., in the shape of a six-sided, hollow cube) that contains immiscible fluids 103 and 105. The simplified electrowetting cell 100 is shown in a non-powered state in which the AC source 110 is not outputting any voltage to the electrodes 120A and 120B.

In the particular example of FIG. 1A, the electrowetting cell 100 includes a first fluid 103 and a second fluid 105 that are immiscible, and the first fluid 103 is conductive. The first fluid 103 may be an aqueous or water solution, and the second fluid 105 may be an oil, such as silicone oil. The electrowetting cell 100 also includes a hydrophobic dielectric layer 130 within the interior space of the electrowetting cell 100. Within the interior space of the electrowetting cell 100 are electrodes 120A and 120B coupled to a voltage source AC 110 that controls operation of the electrowetting cell 100. Adjacent to one of the electrodes, in this case electrode 120B, is the dielectric layer 130 of the enclosed electrowetting cell 100.

The liquid 103 responds to an electrical force created by a voltage applied by the AC power supply 110, to shape the liquid 105 in the interior of the electrowetting device 110. For example, the curved meniscus of the liquid 105 may cause input light to either focus or diverge depending upon the direction of the input light into the electrowetting cell 100. As is known in the electrowetting optic arts, different liquid surface shapes including waveforms, such as a sawtooth waveform, may be formed within an appropriately configured electrowetting device.

The following discussion proceeds to the illustration of FIG. 1B illustrates a failure of the dielectric layer 130. In the electrowetting cell 100 of FIG. 1B, the electrode 120B associated with the dielectric layer 130 is an anode electrode, and the electrode 120A opposite the dielectric layer 130 is a cathode. When the AC voltage is applied by the AC source 110 to the electrowetting cell 100, the shape of the meniscus between the water solution 103 and oil 105 may change from concave to convex, and the positively-charged hydrogen ions (H+) and the negatively-charged oxygen ions ($O_2-$) generated within the aqueous or water solution 103 due to hydrolysis are distributed throughout the volume of the water solution 103. As illustrated, the movement 150 of the positively-charged hydrogen ions and the movement 160 of the negatively-charged oxygen ions within the water solution 103 depicts the distribution of the respectively charged ions throughout the water solution's volume. In addition, the electrical current 140 within the conductive water solution 103 is also shown traversing back and forth between electrodes 120A and 120B according to the applied AC voltage.

The electrowetting cell 100 of FIG. 1B includes the pair of electrodes 120A and 120B, and a dielectric 130 with hydrophobic properties in which a puncture or hole 188 is present in the dielectric 130. The hole 188 in the dielectric 130 may result from a breakdown of the dielectric 130 due to a non-uniformity, or introduction of impurities into the dielectric 130, when depositing the dielectric 130 on the electrode 120B. The oil 105, as an insulator, acts as a dielectric; therefore the effects of the hole 188 may be minimal in an operating state in which the oil covers the hole 188. However, in some states, when the electrowetting cell 100 is operating normally, the meniscus between the liquids 103 and 105 may shift to expose the area of the hole 188 to the water 103. In such a state, due to electrolysis in that particular region, the area of the region may breakdown more rapidly than other areas, such as an area of the dielectric frequently covered by the oil 105 during normal operation. While a thicker coating of dielectric 130 may increase the durability of the dielectric 130, a higher voltage must be used to operate the electrowetting cell 100.

In the AC example of FIG. 1B, the ions tend to distribute fairly uniformly throughout the conductive water solution 103. As shown in FIG. 1C, however, when a DC voltage having a particular polarity is supplied from the DC source 111 to the electrowetting cell 100, the oxygen ions and the hydrogen ions are drawn, as a result, to the electrodes 120A or 120B coupled to the opposite pole (negative or positive) of the DC source 111. The electrode 120A is coupled to the negative terminal of the DC source 111, and acts as a cathode. The electrode 120B is coupled to the positive terminal of the DC source 111, and acts as an anode.

After some time, the negatively-charged oxygen ions ($O2-$) migrate toward the electrode 120B as shown by the negative ION movement 162, and the positively charged hydrogen ions ($H+$) migrate toward the electrode 120A as shown by the positive ION movement 152. The electrical current 142 flows from the electrode 120B (anode) in the direction of the electrode 120A (cathode). As the negatively-charged oxygen ions begin to build up around the electrode 120B, the electrode 120B begins to oxidize. The electrode 120B oxidizes as illustrated in FIG. 1D enough that a buildup of Aluminum Oxide ($Al_2O_3$) forms a dielectric plug 189 that fills the dielectric hole 188. In this way, driving the cell for some time with a DC voltage can provide some degree of repair of the puncture in the dielectric layer 130.

In addition to the above, other similarly passive electrowetting repair methods include simply driving operation of electrowetting cell with an AC signal with a DC offset. The DC offset in combination with the AC signal degrades the operation of the electrowetting cell under normal operating conditions. Exacerbating the situation is the fact that during a failure condition, the AC signal is not conducive to an electrowetting cell repair process.

SUMMARY

The prior methods do not provide for detection of failures, an ability to intelligently switch between applying an AC voltage to applying a DC voltage upon detection of a failed electrowetting cell, or provide a method to prevent catastrophic failure if the repair process is unsuccessful. There is room for further improvement to address one or more of the issues outlined above.

The detailed description below and the accompanying drawings disclose examples of an intelligent system that enables self-healing of a dielectric of an electrowetting device. In such an example, the system includes a switchable alternating current/direct current (AC/DC) electrical power supply, a monitoring circuit, and a controller. The switchable alternating current/direct current (AC/DC) electrical power supply is selectively switchable between providing AC electrical power and DC electrical power to electrodes of the electrowetting device. The monitoring circuit is coupled to the switchable AC/DC electrical power supply, and is configured to output a signal relative to an operating characteristic of the AC/DC electrical power supply. The operating characteristic changes based on an operating status of the dielectric of the electrowetting device. The controller is coupled to the monitoring circuit and the switchable AC/DC electrical power supply. The switchable AC/DC electrical power supply switches the AC/DC electrical power supply from outputting AC power to outputting DC power in response to a signal from the monitoring circuit generated in reaction to a change in the operating characteristic of the AC/DC electrical power supply. The change in the operating characteristic of the AC/DC electrical power supply may be caused by a failure in the dielectric of the electrowetting device.

In another example, a self-healing electrowetting system is provided that includes an electrowetting device, a switchable alternating current/direct current (AC/DC) power supply, a monitoring circuit, and a controller. The electrowetting device has an interior space. Within the interior space of the electrowetting device is a first fluid having a first index of refraction, a second fluid having a second index of refraction within the interior space of the electrowetting device, and a dielectric. The electrowetting device has an anode associated with the dielectric and a cathode. The first and second fluids are immiscible, and the first fluid is conductive. The switchable alternating current/direct current (AC/DC) power supply is coupled to the electrowetting device, and is configured to selectively switch between providing AC power and DC power to the electrowetting device in response to a control signal. The switchable AC/DC power supply has an operating characteristic indicating a normal operation of the electrowetting device. The monitoring circuit is coupled to the switchable AC/DC electrical power supply. The monitoring circuit is configured to detect a change of an operating characteristic of the AC/DC electrical power supply. The changed operating characteristic is in response to a failure of the dielectric of the electrowetting device. The controller is coupled to the monitoring circuit and the switchable AC/DC electrical power supply. The controller may be configured to, in response to receiving a signal from the monitoring circuit indicating the change in the AC/DC electrical power supply operating characteristic, switch the AC/DC electrical power supply from outputting AC power to outputting DC power to the electrowetting device to repair the failed dielectric. The controller determines that the failure has been corrected. After determining the failure has been corrected, the AC/DC electrical power supply is switched from outputting DC power to outputting AC power to the electrowetting device.

A process example is also provided. In the process example, a controller enables a normal operating mode for the electrowetting system that includes supplying AC power to an electrowetting device of the electrowetting system. The electrowetting device is monitored for a failure related to the electrowetting device. In response to a detection of a failure, the normal operating mode is disabled by stopping the supply of AC power to the electrowetting device. A self-healing mode is enabled that supplies DC power to the electrowetting device. The DC power causes an electrolysis reaction within the electrowetting device. The self-healing mode is monitored by determining whether the failure has been corrected. In response to a determination that the failure has been corrected by the electrolysis reaction within the electrowetting device, the self-healing mode is disabled. The normal operating mode may be re-enabled to supply AC power to the electrowetting device.

An example of a lighting device is also provided. In the example, the lighting device includes a light source, an electrowetting device, a switchable alternating current/direct current (AC/DC) power supply, a monitoring circuit, and a controller. The electrowetting device includes a first fluid having a first index of refraction, a second fluid having a second index of refraction and a dielectric. The first and second fluids are immiscible, and the first fluid is conductive. The first and second fluids are within an interior space of the electrowetting device. The electrowetting device has an anode associated with the dielectric and a cathode. The switchable AC/DC power supply is coupled to the electrowetting device, and is configured to selectively switch between providing AC power and DC power to the electrowetting device in response to a control signal. The switchable AC/DC power supply has an operating characteristic indicating a normal operation of the electrowetting device. The monitoring circuit is coupled to the switchable AC/DC electrical power supply. The monitoring circuit is configured to detect a change of the operating characteristic of the AC/DC electrical power supply. The changed operating characteristic is in response to a failure of the dielectric of the electrowetting device. The controller is coupled to the light source, the monitoring circuit and the switchable AC/DC electrical power supply. The controller may be configured to, in response to receiving a signal from the monitoring circuit indicating the change in the AC/DC electrical power supply operating characteristic, switch the AC/DC electrical power supply from outputting AC power to outputting DC power to the electrowetting device to repair the degraded dielectric. In response to a determination the failure has been corrected, the AC/DC electrical power supply is switched from outputting DC power to outputting AC power to the electrowetting device.

In a number of examples, an artificial lighting device includes a light source configured to provide artificially generated light for a general lighting application and a controllable electrowetting device coupled to optically process the light output from the light source. The controllable electrowetting device may provide beam shaping and/or beam steering.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION

Figure 1A:
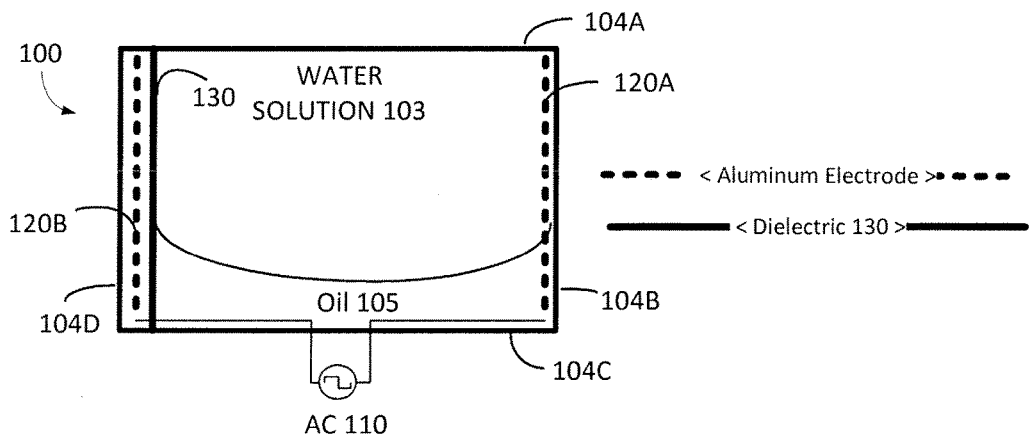
FIGS. 1A-1D illustrate in a high-level general block diagram reactions in a simplified, prior art electrowetting device during a typical operation; in the presence of a hole in a dielectric of the simplified electrowetting device; and while performing a repair operation, respectively.
Figure 1B:
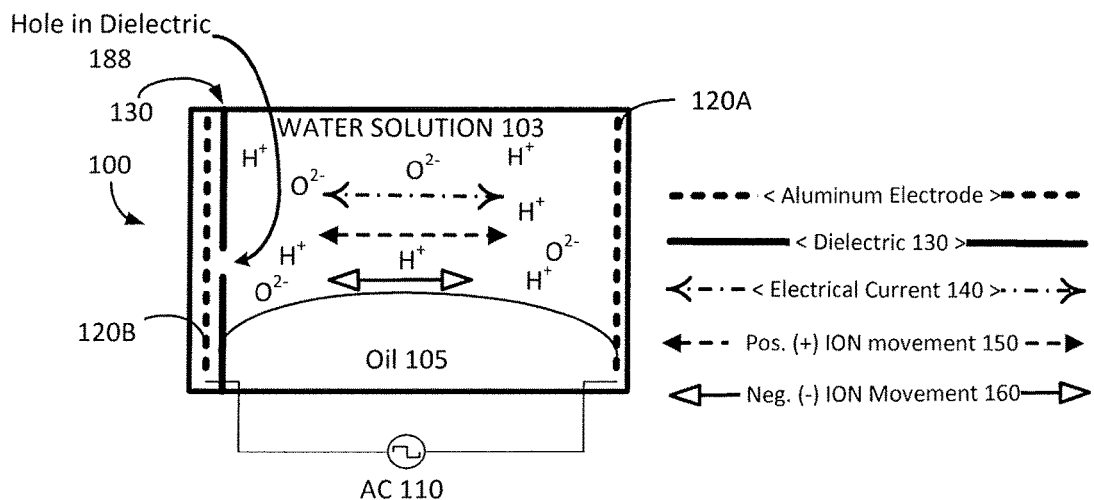
Figure 1C:
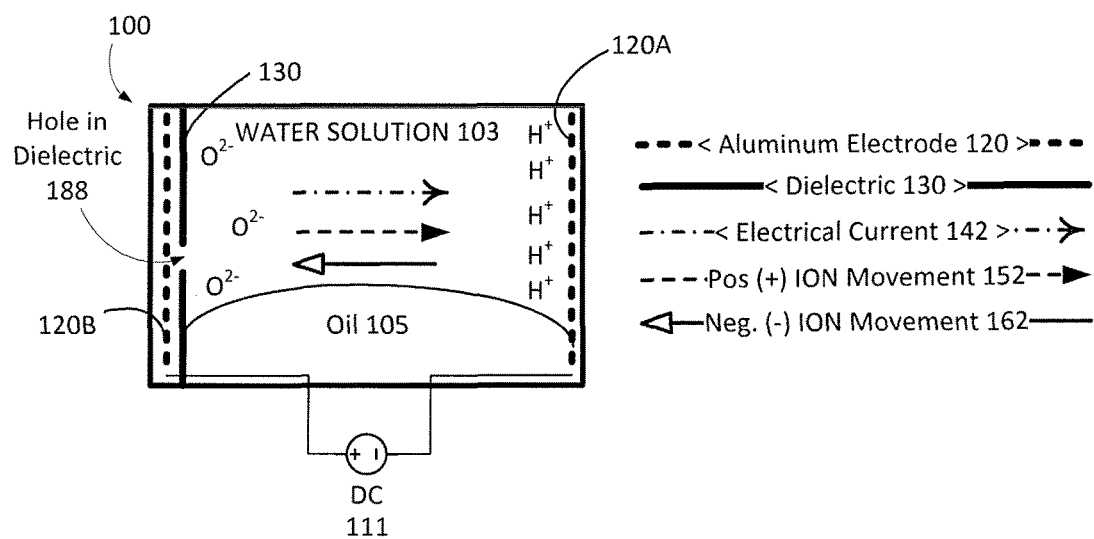
Figure 1D:
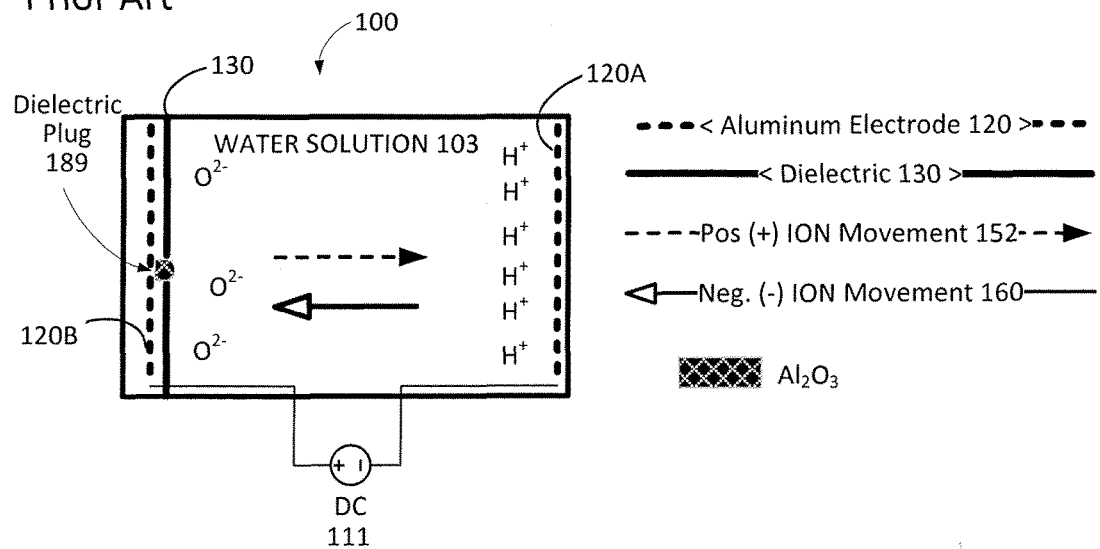

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The examples discussed below and shown in the drawings improve over the art by providing an intelligent self-healing electrowetting control system. Examples of the control system monitor the operation of an electrical power supply to detect a change in an electrical power supply operating characteristic that is indicative of a dielectric failure within an electrowetting device, for example in a device driven by an AC signal provided by the electrical power supply. By being able to identify the electrowetting device failure prior to a catastrophic failure of the electrowetting device, a described controller is able to detect the failure during normal operation, switch from outputting an AC signal to outputting a DC signal to effect a self-healing process within the electrowetting device, for example, quickly and in a more timely manner than previously described systems. In addition to intelligently detecting the evidence of an electrowetting device failure and responding with a self-healing process, the disclosed systems and processes may offer the further improvement of being able to determine the success of the self-healing process and return the electrowetting device to normal operation. Alternatively, if the self-healing process is unsuccessful, the disclosed systems and processes are able to prevent catastrophic failure of the electrowetting device by no longer supplying power to the electrowetting device.

The electrical power supply operating characteristic, such as electrical current supply, voltage supply, impedance or the like, may normally be an indicator of proper operation of the electrowetting device. A change in the electrical power supply operating characteristic may be an indication of a failure, of the dielectric coating of the electrowetting device, a rupture of the electrowetting device, an open circuit, or the like. For example, a failure or failure of the dielectric of the electrowetting device may cause an increase in the current drawn consistent with a resistive load, in some examples, the current is approximately 200 µA RMS, from the power supply by the electrowetting device. Current draw of an electrowetting device is dependent on the physical dimensions of the electrowetting device, so exact current draw are device dependent. When this change in operating characteristic is detected, the AC driving signal being applied to the electrowetting device will be deactivated to prevent further damage. Then a DC voltage will be applied to induce electrolysis for the self-healing process. The cell will be monitored to detect if the process is successful, or shut the cell down if it is not successful thereby preventing catastrophic failure of the electrowetting device. Once the self-healing process is successful, i.e., the current draw has reduced to zero amperes, the DC voltage will be removed and the AC voltage re-applied to continue normal operation.

The term "lighting device" as used herein is intended to encompass essentially any type of device that processes power to generate light, for example, for illumination of a space intended for use of or occupancy or observation, typically by a living organism that can take advantage of or be affected in some desired manner by the light emitted from the device. However, a lighting device may provide light for use by automated equipment, such as sensors/monitors, robots, etc. that may occupy or observe the illuminated space, instead of or in addition to light provided for an organism. A lighting device, for example, may take the form of a lamp, light fixture or other luminaire that incorporates a source, where the source by itself contains no intelligence or communication capability (e.g. LEDs or the like, or lamp ("regular light bulbs") of any suitable type) and the associated spatial optical modulator (e.g., electrowetting device). Alternatively, a fixture or luminaire may be relatively dumb but include a source device (e.g. a "light bulb") that incorporates the intelligence and spatial modulation capabilities discussed herein. In most examples, the lighting device(s) illuminate a service area to a level useful for a human in or passing through the space, e.g. regular illumination of a room or corridor in a building or of an outdoor space such as a street, sidewalk, parking lot or performance venue.

The term "coupled" as used herein refers to any logical, physical, optical or electrical connection, link or the like by which forces, energy, signals or other actions produced by one system element are imparted to another "coupled" element. Unless described otherwise, coupled elements or devices are not necessarily directly connected to one another and may be separated by intermediate components, elements or communication media that may modify, manipulate or carry the signals. The "coupled" term may apply to mechanical coupling, optical coupling or to electrical coupling. For example, the electrowetting device as a controllable optical modulator is coupled by any of various available optical techniques to receive and modulate light output from the source, whereas a processor or the like may be coupled to control and/or exchange instructions or data with other elements of a device or system via electrical connections, optical connections, electromagnetic communications, etc.

A transmissive electrowetting optic bends or shapes light passing or transmitted through the electrowetting optic. The degree of bending or shaping varies with the angle or shape of the fluid interface surface in response to the applied electric field. A transmissive optic, for example, can take the form of a variable shaped lens, a variable shaped prism, a combination of prism and lens optics, or even a variable shaped grating formed by a wavefront across the interface surface.

By contrast, a reflective electrowetting optic reflects light, and the angular redirection and/or shaping of the reflected light varies with the angle or shape of the fluid interface surface in response to the applied electric field. The two-liquid system may be controlled like a prism, e.g. in front of a mirror surface within the optic. Alternatively, the system may be configured such that the variable shaped surface itself is reflective.

Reference now is made in detail to the examples illustrated in the accompanying drawings and discussed below.

Figure 2:
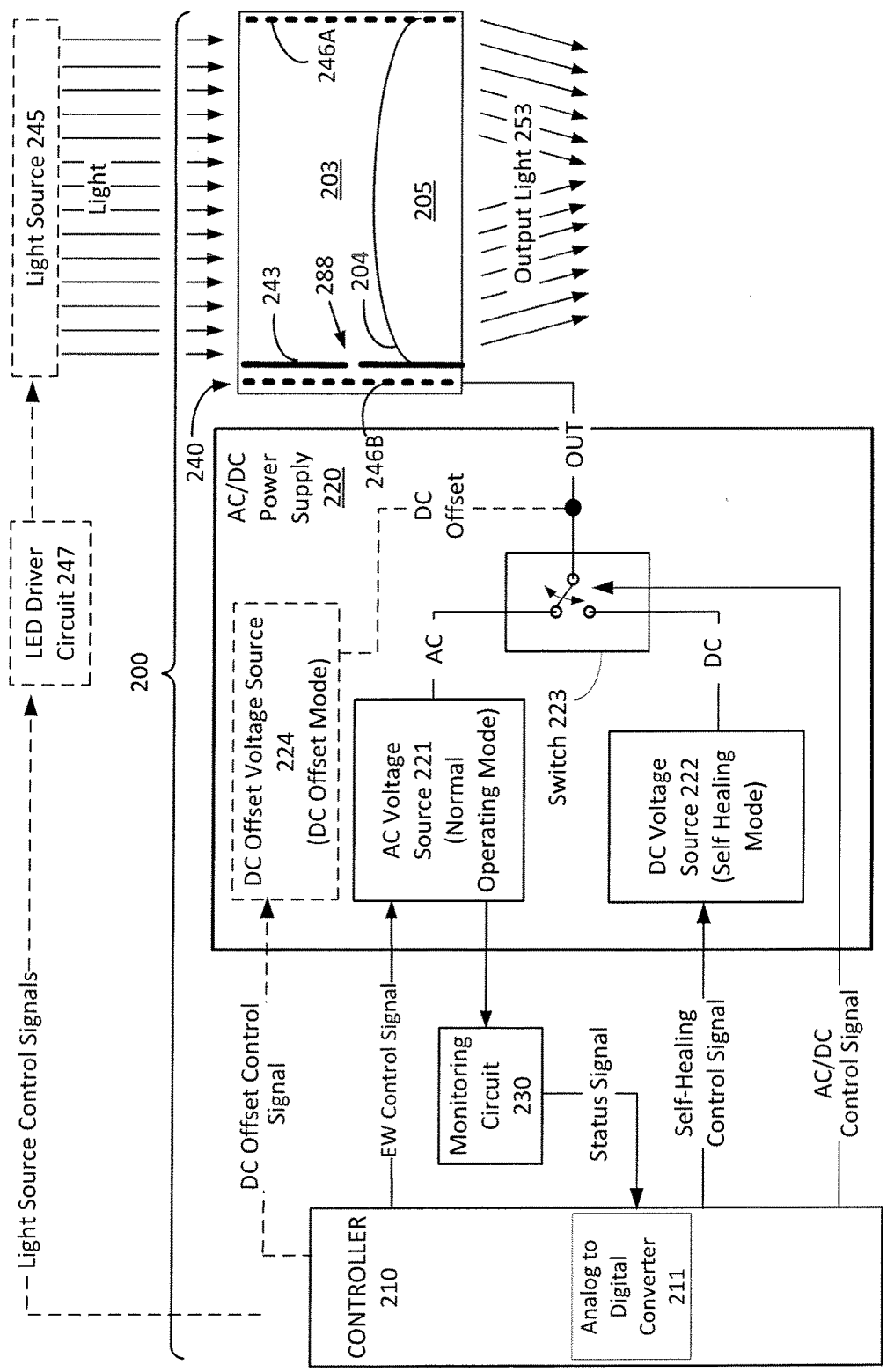
FIG. 2 is a high-level functional block diagram of an example of a control system that enables intelligent self-healing of an electrowetting system usable, for example, in a lighting device, a lighting system or an apparatus.

FIG. 2 is a high-level functional block diagram of an example of self-healing electrowetting system usable, for example, in a lighting device, system or apparatus.

The control system 200 of FIG. 2 includes a controller 210, a switchable alternating current/direct current (AC/DC) electrical power supply 220, a monitoring circuit 230, and an electrowetting device 240. The control system 200 may also be incorporated in a lighting device 290 that includes a light source 245 optically coupled to the electrowetting device 240. In a lighting device 290 example, the controller 210 controls operation of both the light source 245 and the electrowetting device 240 to provide adjustable general illumination to an area in which the lighting device 290 is located. For example, the controller 210, in normal operation of the electrowetting device 240, causes the electrical power supply 220 to apply a voltage to the anode 246B and cathode 246A of the electrowetting device 240 to control a shape of a fluid interface, or meniscus, 204 between the first 203 and second 205 fluids.

In the examples illustrated herein, the electrowetting device 240 may be configured to provide either a transmissive electrowetting optic or a reflective electrowetting optic. The electrowetting device 240 may have a fluidically sealed interior space filled with first 203 and second 205 fluids that are immiscible. The first fluid 203 is relatively conductive, and has a first index of refraction. The second fluid 205 has a second index of refraction different from the first index of refraction. The second fluid 205 may be relatively non-conductive.

Electrodes 246A and 246B may be positioned about the electrowetting device 240, and may be coupled to the first fluid 203 and to the switchable AC/DC electrical power source 220. The first fluid 203 is responsive to an electrical signal applied to the electrodes 246A, 246B from the switchable AC/DC power supply 220 via switch 223 which is coupled to the electrodes 246A, 246B.

For ease of illustration, only a single line (labeled OUT) is shown connecting the switch 223 with the electrowetting device 240. However multiple conductors may be coupled between the switch 223 and the electrowetting device 240 to provide electrical power to the various elements of the electrowetting device 240. In this example, the electrowetting device 240 is shown with only two electrodes 246A, 246B, and one dielectric 243. The dielectric 243 may be a dielectric material, such as Parylene C or the like, that has hydrophobic properties as do some or all of the walls (including a front and a back wall that are not shown due to the two-dimensional nature of the FIG. 2) of the electrowetting device 240.

The electrodes 246A and 246B may be Aluminum, but other conductive materials may be used as electrodes. In the self-healing examples, the conductive materials of any electrode covered by a dielectric are capable of oxidizing. In the example, the dielectric 243 is shown with a hole 288, which is a failure that may instigate the initiation of the self-healing mode. Such a failure of the dielectric 243 of the electrowetting device 240 may cause a marked increase in the current drawn from the power supply 220 by the electrowetting device 240.

While only two electrodes 246A and 246B and one dielectric 243 are shown, the electrowetting device 240 may have more than two electrodes and one dielectric, and, as a result, the fluid interface 204 of the electrowetting device 240 may be responsive to multiple control signals from the controller 220. The controller 220, when part of a lighting device, may output different electrowetting control signals thereby creating infinite variety of combinations of beam shaping and beam steering processing of the light received from the light source 245.

The first fluid 203 may be a water solution (e.g. saline or aqueous solution), while the second fluid 205 may be a less conductive oil. Of course, other combinations of immiscible liquids that are sufficiently transparent, have different indices of refraction and are electrically controllable may be used. Specific fluids that may be used as the first fluid 203 include, for example, aqueous solutions for the more conductive liquid, such as: aqueous mixtures of Sodium Dodecyl Sulfate (SDS), aqueous mixtures of Potassium Chloride (KCL), Propylene Glycol (PG), or the like. Specific fluids that may be used for the less conductive second fluid 205 include, for example, Dow Corning OS-20, Dodecane, silicone oil, or the like. In this example, the electrowetting device 240 has a physical shape of a cube or rectangular box, and by being fluidically sealed retains the liquids 203 and 205 to provide an electrically controllable liquid optic. Other electrowetting optic devices may use enclosed capsules of different shapes.

The switchable AC/DC electrical power supply 220, in the example, is selectively switchable between providing AC electrical power, such as an AC voltage or current, and DC electrical power, such as a DC voltage or current, to two or more electrodes of the electrowetting device 240. For example, the AC/DC electrical power supply 220 may include an AC voltage source 221, a DC voltage source 222 and a switch 223. In an example, the AC voltage source 221 may output a controllable AC voltage to the switch 223. The controller 210 may output to the switch 223 an AC/DC control signal that configures the control system 200 for a normal operating mode. The switch 223 in response to the normal operating mode AC/DC signal received from the controller 210 is configured to output the AC voltage to the electrowetting device 240. The liquid 203 within the electrowetting device 240 responds to a selected AC voltage across the electrodes 246A and 246B to produce a particular fluid interface, or meniscus, shape at the fluid interface 204 and thus a particular lens, reflector or prism stat for processing of light passing through the device 240.

The monitoring circuit 230 is also coupled to the switchable AC/DC electrical power supply 210. The controller 210 may receive status signals from the monitoring circuit 230. For example, the monitoring circuit 230 is configured to output a signal, such as a status signal, relative to an operating characteristic of the AC/DC electrical power supply. The AC/DC electrical power supply 220 operating characteristic changes based on changes of operating status of the electrowetting device. Examples of changes in characteristics of the supply 220 include increased/decreased current or voltage output, increased/decreased impedance or the like. A failure of the dielectric, for example, decreases the impedance between the electrodes of the electrowetting device 240. The drop in impedance of the load across the AC output of the supply 220 causes a drop in voltage at the output and/or an increase in output current drawn from the supply 220.

The controller 210 is coupled to the monitoring circuit 230 and the switchable AC/DC electrical power supply 220. The controller 210 is configured to switch the AC/DC electrical power supply from outputting AC power to outputting DC power in response to the status signal from the monitoring circuit 230 generated in reaction to a change in the operating characteristic of the AC/DC electrical power supply 220 indicating a failure of the device 240 (e.g., a dielectric failure). The change in the operating characteristic of the AC/DC electrical power supply 220 may be caused by a failure in a dielectric of the electrowetting device 240, such as a hole in the dielectric 243.

In an example of a lighting device application, the system 200 may be coupled to the light source 245 that when coupled to the electrowetting device 240 provides a lighting device incorporating the system 200 with controllable output light 243. For example, during a normal operating mode of the control system 200, the AC/DC power supply 220 provides AC voltage in response to electrowetting (EW) control signals output from the controller 210 to control the electrowetting device 240. The electrowetting (EW) control signals enable the electrowetting device 240 to be controlled to provide, for example, beam shaping and beam steering of light received from the light source 245. The light from the light source 245 may be a shaped (e.g., focused or dispersed) and/or steered (e.g., left, right, forward, backward or a combination of those) by the electrowetting device 240. For example, the electrowetting device 240 may be configured to steer or direct light output 253 from the electrowetting device 240 in a direction as shown in FIG. 2.

The controller 210 may also control the optional light source 245 by controlling whether the light source is ON or OFF, intensity, spectral characteristic, combinations of the intensity and duration (e.g., for general illumination and/or visible light communication, or the like) of light output from the light source 245, and the like. The light source 245 may include or connect to an LED driver circuit 247. The LED driver circuit 247 may include or connect to an AC or DC current source or voltage source, and may include a regulator, an amplifier (such as a linear amplifier or switching amplifier), a buck, boost, or buck/boost converter, or any other similar type of circuit or component (none shown in this example). The LED driver circuit 247 outputs a variable voltage or current to adjustably operate the LED light source 245.

In yet another self-healing example, the switchable AC/DC power supply 220 may be configured with a variable or fixed DC offset voltage source 224. The DC offset voltage source 224 may be configured to output a DC voltage upon receipt of signals from the controller 210 to operate in an optional AC and DC Offset mode (which is described in more detail with reference to the examples of FIGS. 5 and 6). The AC and DC Offset mode may be a mode that is supplemental to the normal operating mode. In the optional AC and DC Offset mode, the controller 210 may provide a signal to the DC offset voltage source 224 indicating a magnitude of the DC offset voltage to be output. The outputted DC offset voltage is added to the AC voltage output by the AC voltage source 221. When the controller 210 outputs a signal switching the switchable AC/DC power supply 220 to the self-healing mode, the DC Offset voltage source 224 is switched OFF.

In a specific example, the system 200 may be an artificial lighting device that includes a light source 245 configured to provide artificially generated light for a general illumination lighting application, the selectively controllable AC/DC power supply 220, the controller 210, the monitoring circuit 230, and the controllable electrowetting device 240 coupled to optically process, for example, providing beam shaping and/or beam steering, of the light output from the light source 245.

The example of FIG. 2 provided a high-level functional block diagram view of a system configuration, it may be helpful to discuss a more detailed explanation with reference to a high-level circuit diagram that provides the functions described above.

Figure 3:
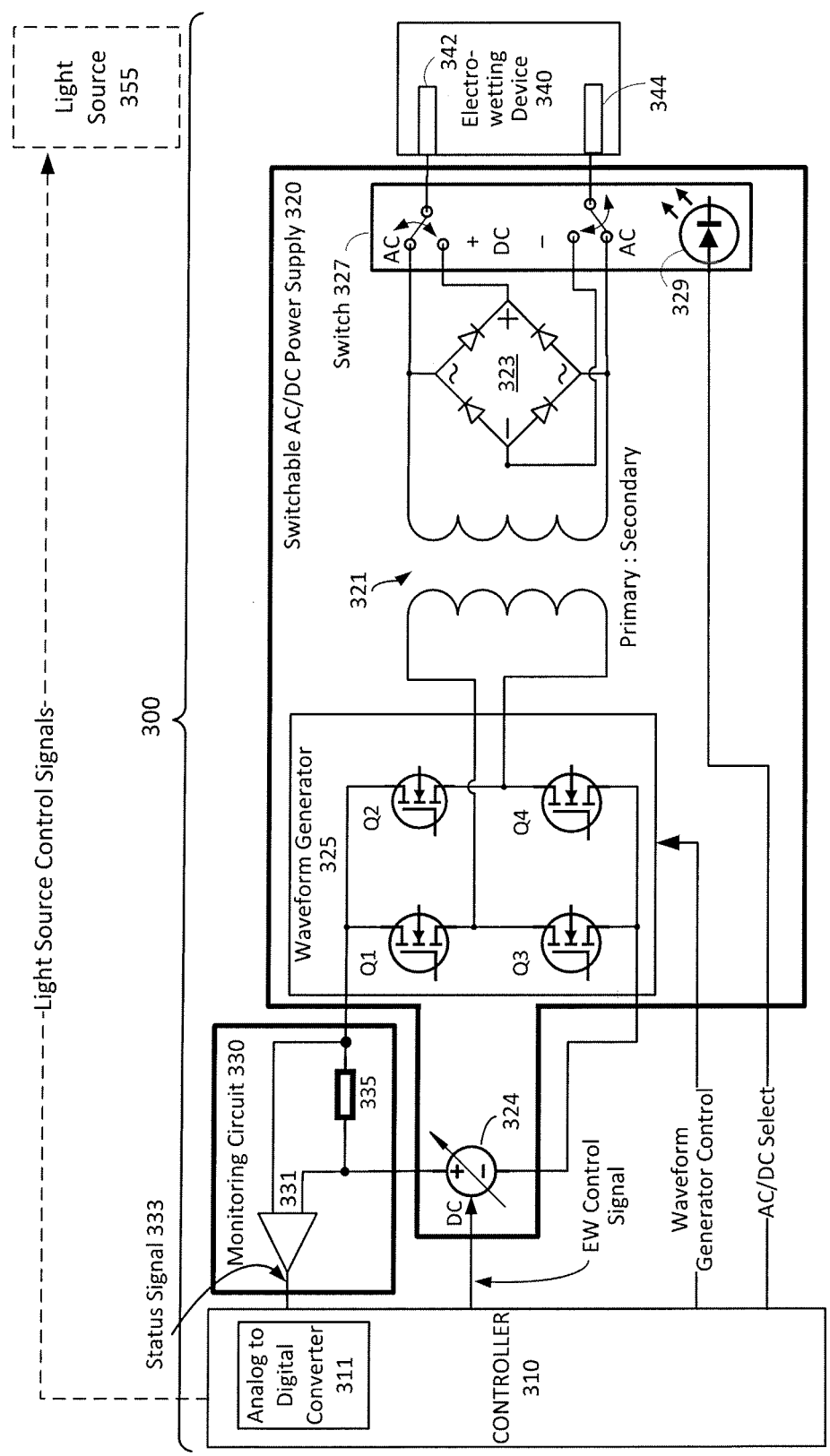
FIG. 3 is a high-level circuit diagram of an example of an intelligent self-healing electrowetting control system.

FIG. 3 is a high-level circuit diagram of an example of self-healing electrowetting system. The system 300 is similar to system 200 of FIG. 2 with regard to the general components. For example, the system 300 includes a controller 310, a switchable AC/DC electrical power supply 320, a monitoring circuit 330 and an electrowetting device 340. The system 300 operates to control the electrowetting device 340 and to enable self-healing of the electrowetting device 340 in response to a failure detected in the electrowetting device 340. The electrowetting device 340 includes electrodes 342 and 344, and is configured in substantially the same manner as electrowetting device 240 of FIG. 2; therefore, a detailed discussion of the structure of electrowetting device 340 will not be provided.

Control of the electrowetting device is provided via the controller 310. The controller 310 is coupled to the switchable AC/DC electrical power supply 320, which is coupled to the electrowetting device 340. The controller 310 outputs control signals to the switchable AC/DC electrical power supply 320. In response to the received control signals, the switchable AC/DC electrical power supply 320 applies either an AC voltage or a DC voltage having a particular magnitude and/or waveform to the electrowetting device 340.

The monitoring circuit 330 is coupled to the switchable AC/DC electrical power supply 320. The monitoring circuit 330 is configured to output a signal relative to an operating characteristic of the AC/DC electrical power supply 320. An operating characteristic of the switchable AC/DC electrical power supply 320 may be a current value, a voltage, an impedance, a combination of current and voltage of one or more components, or the like. Changes in the operating characteristic of the switchable AC/DC electrical power supply 320 may be the result of a change in an operating condition of the electrowetting device 340. For example, a failure of the dielectric, such as 243 of FIG. 2, or failure of another component within the electrowetting device 340 may cause an increase in the electrical current drawn from the switchable AC/DC electrical power supply 320 and the variable DC voltage source 324 because the dielectric failure may create a short circuit (i.e., a reduced impedance between the anode 342 and cathode 344 electrodes of the electrowetting device 340) within the electrowetting cell 340. The monitoring circuit 330 may include circuit components configured to detect the increased current drawn by the electrowetting device 340. Alternatively, or in addition to detecting an increase in current, other methods of detecting the presence of a failure in an electrowetting device include measuring the capacitance of the electrowetting device (e.g., where a drop in capacitance indicates a failure), and/or detecting the amount of hydrogen and/or oxygen (e.g., by using platinum as an indicator) produced within the cell.

In more detail with regard to the illustrated example, the switchable AC/DC electrical power supply 320 may include a variable input DC electrical source 324, a waveform generator 325, a transformer 321, a rectifier circuit 323 and a controllable switch 327. The variable input DC electrical source 324 may be coupled to the monitoring circuit 330, and is responsive to control signals from the controller 310. In response to the control signals, the DC source 324 outputs, for example, a voltage to the waveform generator 325. Of course, the electrical power supplied by the variable DC electrical source 324 may be referred to as a current or a signal. The waveform generator 325 may be coupled to the variable input DC source 324, the controller 310 and the transformer 321.

More specifically, the waveform generator 325 is coupled to the DC source 324 and receives a DC voltage from the DC source 324. The waveform generator 325 includes transistors Q1, Q2, Q3 and Q4 that are switched in response to waveform generator control signals received from the controller 310. For example, the waveform generator 325 may be controlled to produce an AC voltage in the shape of a sinusoid, square wave, sawtooth or the like. Based on the waveform generator control signals output by the controller 310 and received by the waveform generator 325, complimentary pairs (e.g., Q1 and Q4, Q2 and Q3) of the transistors Q1, Q2, Q3 and Q4 in the waveform generator 325 are alternately turned ON and OFF to produce an AC voltage that is applied to the primary winding of the transformer 321. The transformer 321 has a primary winding and a secondary winding, and transforms the AC electrical signal generated by the waveform generator 325 into a transformed electrical AC signal. A rectifier circuit 323 is coupled to the outputs of the secondary winding of the transformation 323

For example, the rectifier circuit 323 is coupled to receive the transformed electrical AC signal from the transformer 321, and is configured to rectify the transformed electrical AC signal. The rectifier 323 is also coupled to the controllable switch 327. The controllable switch 327 is configured with a first set of terminals coupled to an output of the transformer 321 and a second set of terminals coupled to an output of the rectifier 323. The controllable switch 327 may have different states. For example, in a first state, that may be a normal operating state, the switch 327 is configured to output AC voltage received from the transformer 321 to the electrowetting device 340; and, in a second state, that may be a self-healing state, the switch 327 is configured to output DC voltage received from the rectifier circuit 323 to the electrowetting device 340. The controllable switch 327 includes an optocoupler, or a solid state relay, 329 coupled to the controller 310 that in response to an AC/DC select signal output by the controller 310 causes the switch 327 to switch from outputting AC voltage to outputting DC voltage to the electrowetting cell 340. The switch 327 may also be controlled in response to another AC/DC select signal output by the controller 310 to switch from outputting DC voltage to outputting AC voltage to the electrowetting cell 340.

The monitoring circuit 330 may include a current sense 335 coupled to output a voltage during operation of the switchable AC/DC electrical power supply 320, and an amplifier 331. The amplifier 331 may be coupled across the terminals of the voltage source 335 to amplify the voltage output across the voltage source 335. The amplifier 331 outputs the amplified voltage to the controller 310 as a status signal 333. For example, the voltage source 335 may be a resistor coupled between a positive terminal of the variable input DC electrical source 324 and an input to the waveform generator 325 of the switchable AC/DC electrical power supply 320.

During normal operation, the switchable AC/DC electrical power supply 320 outputs a substantially steady-state current within a predetermined tolerance as an operating characteristic. The monitoring circuit 330 responds to the steady state current by outputting an analog voltage from the voltage source 335 to the amplifier 331. The amplifier 331 outputs an amplified analog voltage as a status signal 333 to the controller 310. The magnitude of amplified analog voltage (i.e., the status signal 333) is an indication of an operating characteristic of the switchable AC/DC electrical power supply 320, which indicates the operating status of the electrowetting device 340. The status signal 333 output from the monitoring circuit 330 changes in response to changes in the current output by the AC/DC electrical power supply 320.

The controller 310 may further include an analog to digital converter 311 that is coupled to the output of the monitoring circuit 330. Of course, the analog to digital converter 311 may be incorporated into the monitoring circuit 330. As mentioned above, the analog to digital converter 311 receives the analog status signal 333 output from the monitoring circuit 330, and converts the analog status signal 333 to a digital signal.

The level of the digital signal output from the analog to digital converter 311 may be indicative of an extent of failure of a dielectric (not shown in this example) of the electrowetting device 340. The status signal 333 may be output continuously to the controller 310. However, the controller 310 may, for example, only sample the status signal 333 at predetermined times, on a periodic basis, or the like. Alternatively, the controller 310 may monitor the status signal continuously to insure that there is not a catastrophic failure (e.g., short circuit in switchable AC/DC electrical power supply 320 or the electrowetting device 340) of any of the components of the system 300. In yet another alternative, the sampling times may vary based on the mode of the system 300. For example, when the system 300 is in the normal operating mode, the sampling times may be less frequent than when the system is in in the self-healing mode or, as mentioned with reference to FIG. 2, the AC and DC Offset mode.

The controller 310 includes a processor (described in more detail with reference to a later example) that is configured to interpret the digital signal output by the analog to digital converter 311. In an example, the controller 310 may be configured to determine whether to remain in a normal operating mode or to switch to a self-healing mode based on the digital signal. For example, the digital value may have a first value that indicates no failure of the dielectric of the electrowetting device 340, and a second different value indicating a failure or failure of the dielectric of the electrowetting device 340. Based on the determination, the controller 310 outputs an AC/DC select signal to the switch 327 indicating the state that the switch 327 is to assume, either AC voltage output or DC voltage output.

In response to an AC/DC select signal output by the controller 310, the AC/DC select signal switch 329 causes elements within switch 327 to selectively connect one of the output of the transformer 321 and the output of the rectifier 323 to supply the selected type of voltage to the electrodes 342 and 344 of the electrowetting device 340.

In a lighting device 390 example, the controller 310 controls operation of both the light source 355 and the electrowetting device 340 to provide adjustable general illumination to an area in which the lighting device 390 is located. For example, the controller 310, in normal operation of the electrowetting device 340, causes the electrical power supply 320 to apply a voltage to the electrodes 342 and 344 of the electrowetting device 340 to thereby control the state of the electrowetting device as explained above reference to FIG. 2.

In the examples illustrated herein, the electrowetting device 240 may be configured to provide either a transmissive electrowetting optic or a reflective electrowetting optic. The electrowetting device 240 may have a fluidically sealed interior space filled with first 203 and second 205 fluids that are immiscible. The first fluid 203 is relatively conductive, and has a first index of refraction. The second fluid 205 has a second index of refraction different from the first index of refraction. The second fluid 205 may be relatively non-conductive.

Figure 4:
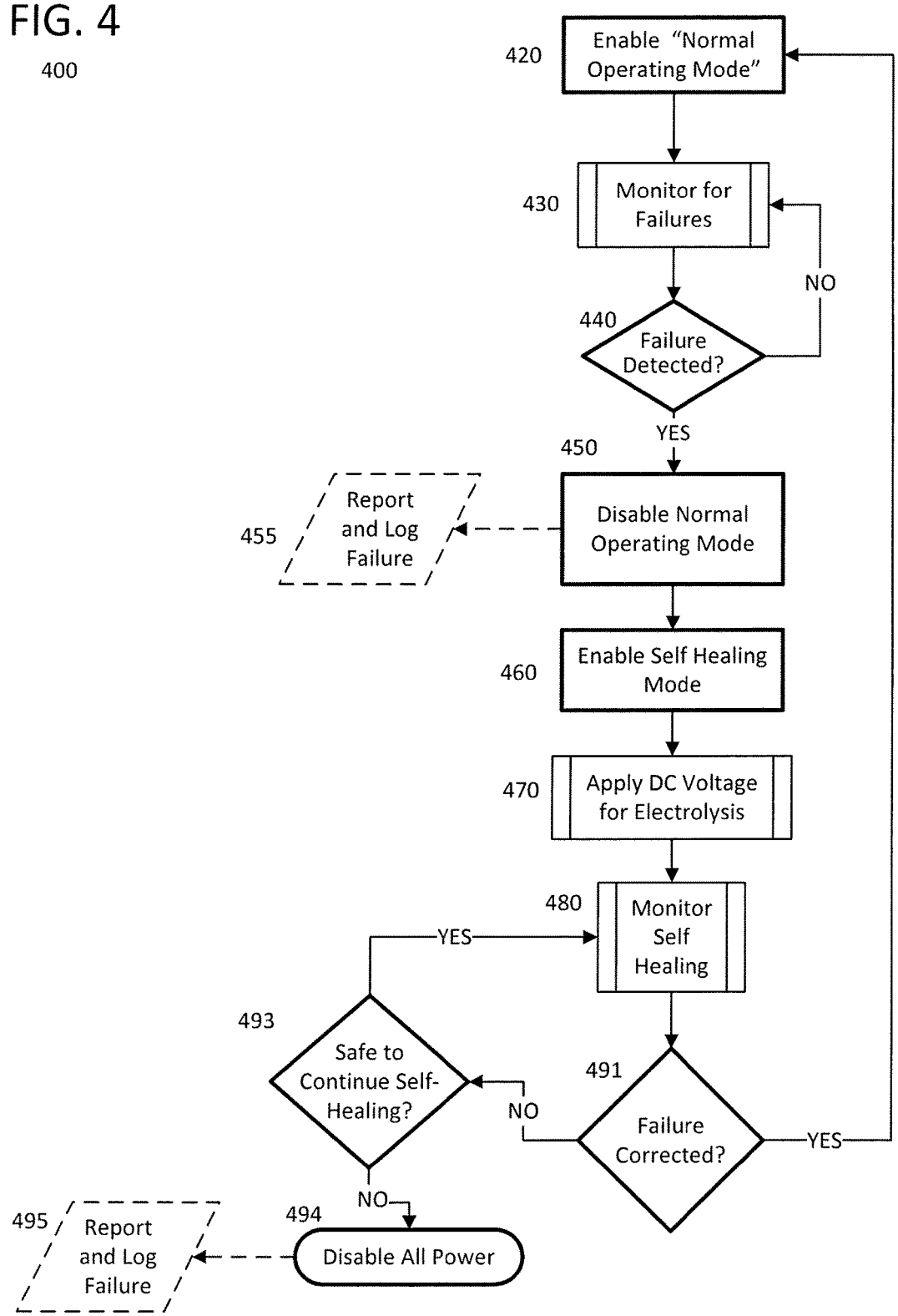
FIG. 4 is a flowchart of an example of a control process for an intelligent self-healing electrowetting control system.

With the structure of the systems 200 and 300 described above, it may be appropriate at this time to describe an operational example of the system 300 in more detail with reference to the flowchart of FIG. 4.

FIG. 4 is a flowchart of an example of a control process for a self-healing electrowetting system. The process 400 may be implemented with a system, such as system 300 of FIG. 3. The process 400 may begin with a controller, such as controller 310 of FIG. 3, enabling operation of the system 300 in a normal operating mode (420). A "normal operating" mode may be a mode in which the controller, such as controller 310 of FIG. 3, outputs control signals, such as an electrowetting (EW) control signal, a waveform generation control signal and an AC/DC select signal, to cause the switchable AC/DC electrical power supply, such as 320 of FIG. 3, to output an AC voltage that is applied to an electrowetting device, such as electrowetting device 340. The voltage applied to the electrowetting device 340, when functioning properly, will cause a steady state current of a predetermined value to be present in the switchable AC/DC electrical power supply. In the normal operating mode for a lighting device, the electrowetting device provides beam shaping and beam steering of light input from a light source to the electrowetting device based on the EW control signals output by a controller. For example, the applied AC voltage causes the first fluid in the electrowetting device to assume a certain orientation in the electrowetting device, and as a result the fluid interface between the first and second fluids has a certain shape. Light provided by the light source to an input of the electrowetting device is processed based on the shape of the fluid interface, or meniscus.

At 430, the electrowetting device is monitored for failures. An electrowetting device failure may be a short circuit, an open circuit, a loss of power, loss of control or other failure that may affect performance of any of the components of the system. In this example, the electrowetting device may be coupled to a monitoring circuit, such as 330 described above, that provides an indication of a status of the electrowetting device by outputting a voltage indicative to a current being supplied by the switchable AC/DC electrical power supply to the electrode. A change in the voltage input to the controller by the monitoring circuit may be interpreted by the controller as an indication of a failure of a dielectric of the electrowetting device. For example, the failure may be a pinhole in the dielectric of the electrowetting device that causes a short circuit between the electrodes of the electrowetting device. The short circuit in the failed electrowetting device reduces impedance of the electrowetting device, thereby causing the current output by the switchable AC/DC electrical power supply to increase. Since the impedance in the failed electrowetting device decreases, the current in the switchable AC/DC electrical power supply increases to supply the increased current demands of the failed electrowetting cell.

At 440, a determination is made whether a failure has been detected. For example, when in the normal operating mode the steady state current generated by the switchable AC/DC electrical power supply may cause the monitoring circuit to generate a steady state voltage. The magnitude of the steady state voltage may be interpreted by a controller coupled to the monitoring circuit as a normal operating condition.

The controller may determine at 440 whether a failure has been detected a number of different ways. Continuing with the short circuit failure of the electrowetting device from above, the monitoring circuit responds to the increase in current by generating an increased voltage (e.g., output from voltage source 335) that is amplified and output to the controller. The controller may receive the amplified voltage from the monitoring circuit, convert the amplified voltage from an analog voltage to a digital value, and determine that the digitized value exceeds a predetermined threshold. For example, the controller may access a look up table or other data structure in memory, and compare the digital value to values stored in the data structure. Based on the result of the comparison, the controller may interpret the digital value as a change in the switchable AC/DC electrical power supply's operating characteristics that indicates a failure in the electrowetting device. Conversely, if the comparison determines that the digital value does not exceed the look up table value, the controller may interpret the digital value as not being a change in the switchable AC/DC electrical power supply's operating characteristics; and, therefore, there is no failure in the electrowetting device. If there is no failure at 440, the system returns to step 430 to continue to monitor for failures.

In an alternative example of the controller determining a failure at 440, when the system is in a normal operating condition, the controller may receive an initial voltage from the monitoring circuit. A digital value representative of the initial voltage may be stored by the controller as a reference value in a memory coupled to the controller. Any subsequent voltages received by the controller from the monitoring circuit while in the normal operating mode, may be compared by the controller to the reference voltage stored in the memory. If one of the subsequent voltages output from the monitoring circuit exceeds the stored reference voltage, the controller may indicate a failure; otherwise, the controller waits at 430 for the next subsequent voltage.

Returning to the flowchart of FIG. 4, if a failure is detected by the controller at 440, the controller at 450 disables the normal operating mode by stopping the supply of AC power to the electrowetting device. The controller may, for example, change or stop outputting one or more of the EW control signal, the waveform generator control signal, or AC/DC Select.

The controller may also be configured with an optional failure tracking and reporting function. For example, at 455, in response to disabling the normal operating mode, the controller may log information regarding the failure into a failure data structure stored in a memory (shown in a later example) coupled to the controller. The controller may, for example, report the information stored into the failure data structure to an external device, such as a server or computer, for analysis.

With regard to the report and failure data structure, the controller may perform additional functions based on the information logged into the failure data structure. For example, the controller may, in response to the detection of the failure, increment a count of the number of failures detected for the electrowetting device. The controller may determine based on information stored in the memory whether the count of the number of failures exceeds a threshold number of allowed failures. The threshold number of allowed failures may be an arbitrary number or may be a number based on simulations of the electrowetting device operation or the like. The controller, in response to a determination that the count exceeds the threshold number of allowed failures, may generate a report of the number of failures. The report may include an identifier of the electrowetting device. In addition or alternatively, the controller may disable both AC and DC power to the identified electrowetting device to avoid catastrophic failure, such as rupturing, of the electrowetting device in response to the number of failures exceeding the threshold number of failures.

Returning to the flowchart example of FIG. 4, in response to disabling the normal operating mode due to the failure, the controller, at 460, enables a self-healing mode by outputting a signal that switches the switchable AC/DC electrical power supply from outputting AC voltage to outputting DC voltage. As explained above, the self-healing mode enables the electrowetting device to repair failures in the dielectric by switching the voltage supplied to the electrowetting device from AC power to DC power. The controller outputs an EW control signal and a waveform generator signal that may be similar to those output during the normal operating mode. In the self-healing mode, the AC/DC select signal causes a switch, such as 327, to couple the output from the DC voltage source, such as rectifier 323, to the electrowetting device. At 470, the DC voltage is applied to the electrowetting device thereby causing an electrolysis reaction within the electrowetting device. In the electrolysis reaction, as explained above, aluminum in the electrode, such as 246B, begins to oxidize thereby filling the hole in the dielectric.

It may take a certain period of time for self-healing of the electrowetting device to complete since to the electrolysis process may take some time to fill the hole in the dielectric. For example, the duration of the certain period of time is dependent upon several factors, such as a magnitude of the DC voltage, the size of hole in the dielectric, the number of holes in the dielectric, concentration of negatively-charged ions, or the like. The controller may include a clock (not shown in this example) that maintains a time duration of the self-healing. In order to determine whether the self-healing is complete, the monitoring circuit continues, at 480, to obtain a voltage indicative of the current being output by the switchable AC/DC electrical power supply to the electrowetting device. The amplified analog voltage is provided to the controller where the analog voltage is converted to a digital voltage value.

The controller, at 491, continues to analyze a digitized voltage value of the amplified analog voltage provided by the monitoring circuit that is used to determine if the failure has been corrected. For example, the controller may compare the digitized values to reference values stored in memory. In a more detailed example, a digitized voltage value indicative of approximate zero (0) microamperes (µA) being drawn from the AC/DC electrical power supply may indicate correction of the failure and the success of the self-healing mode. If the comparison of the digitized voltage value to the reference values indicates that self-healing has not completed because the current in the switchable AC/DC electrical power supply has not decreased to substantially match a digitized reference value, the process 400 continues to 493, where the controller determines whether it is safe to continue with the self-healing. At 493, the controller may, for example, determine whether it is safe or not to continue the self-healing mode based on the amount of time that the system has been in the self-healing mode. For example, a self-healing mode duration threshold for safe operation of the system may be one (1), two (2) minutes, five (5) minutes, or the like. If the controller determines at 493 that it is safe to continue operating in the self-healing mode, the process 400 returns to monitoring the self-healing at 480.

Alternatively, if, at 491, the determination is that the failure has been corrected and the self-healing has completed, the process returns to 420 to enable the normal operating mode. For example, if the controller determines that the digital voltage value indicates that the current supplied by the switchable AC/DC electrical power supply has decreased, the controller may determine that the failure has been corrected and the self-healing has completed. As a result of the determination at 491 being that the failure has been corrected and self-healing is complete, the process returns to enable normal operating mode at 420, and process 400 continues.

As discussed with reference to FIG. 2, the application of the DC voltage at step 470 causes the migration of oppositely-charged ions to the respective poles within the electrowetting device. The presence of negatively-charged oxygen ions in close proximity to the oxidizing electrode (e.g., 246B of FIG. 2) and the dielectric (e.g., 243 of FIG. 2) drives the electrolysis reaction that enables the self-healing of the dielectric in the electrowetting device. The electrolysis reaction of self-healing may be stimulated to occur more slowly over time by applying a constant DC voltage to the electrowetting device in combination with an AC voltage, such as the optional AC and DC Offset mode described above with reference to FIG. 2.

Figure 5:
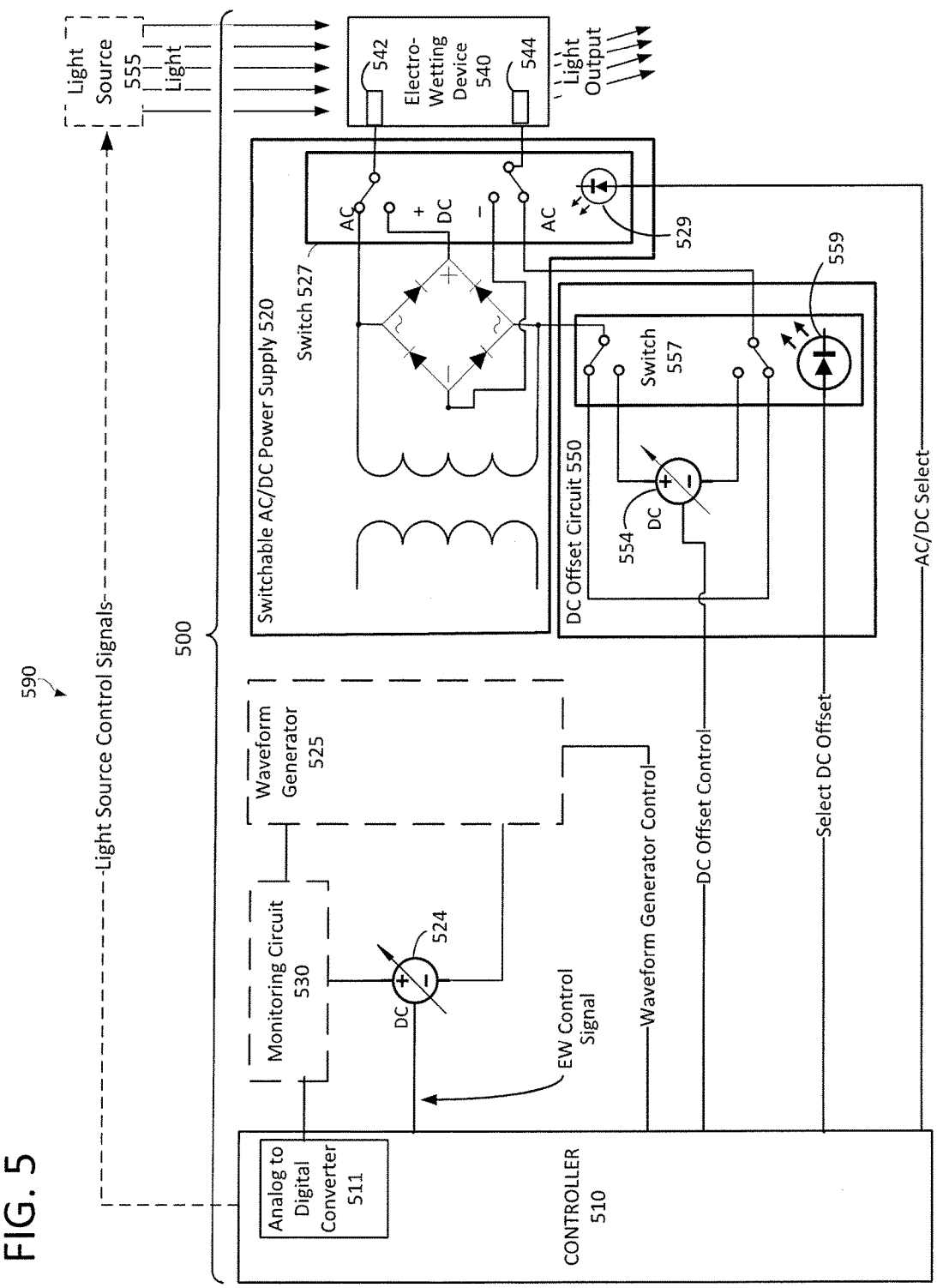
FIG. 5 is a high-level circuit diagram of an example of a self-healing electrowetting control system with a DC offset capability.

An example of a system configured to provide the AC and DC offset mode will be described in more detail with reference to FIG. 5. FIG. 5 is a high-level circuit diagram of another example of self-healing electrowetting system. The system 500 is similar to system 200 of FIG. 2 with regard to the general components. For example, the system 500 includes a controller 510, a switchable AC/DC electrical power supply 520, a monitoring circuit 530 and an electrowetting device 540. The system 500 operates to control the electrowetting device 540 and to enable self-healing of the electrowetting device 540 in response to a failure detected in the electrowetting device 540. The electrowetting device 540 includes electrodes 542 and 544, and is configured in substantially the same manner as electrowetting device 240 of FIG. 2; therefore, a detailed discussion of the structure of electrowetting device 540 will not be provided. In addition, the structural features, connections and functional details of the waveform generator 525 and monitoring circuit 530 are substantially similar to those of waveform generator 325 and monitoring circuit 330, respectively, and therefore a detailed discussion of those similar structural features, connection and functional details will be omitted from the following discussion of FIG. 5.

Control of the electrowetting device 540 is provided via the controller 510. The controller 510 is coupled to the switchable AC/DC electrical power supply 520, which is coupled to the electrowetting device 540 for the purpose of providing electrical power. The controller 510 outputs control signals to the switchable AC/DC electrical power supply 520. In response to the received control signals, the switchable AC/DC electrical power supply 520 applies either an AC voltage or a DC voltage having a particular magnitude and/or waveform to the electrowetting device 540.

In more detail regarding the switchable AC/DC electrical power supply 520, the waveform generator 525 is coupled to the variable DC voltage source 524 from which is received a DC voltage. For example, the waveform generator 325 may be controlled to produce an AC voltage waveform that is output to the transformer 521 of the switchable AC/DC electrical power supply 520.

As described in the discussion of the rectifier circuit 323 of FIG. 3 above, the rectifier circuit 523 is configured to rectify the transformed electrical AC signal output from the transformer 521 to a DC voltage. The rectifier 523 is coupled to the controllable switch 527. The controllable switch 527 is configured with a first set of terminals coupled to an output of the transformer 521, a second set of terminals coupled to an output of the rectifier 523, and a set of output terminals that are coupled to the electrowetting device 540. The controllable switch 527 may have different states. For example, in a first state, referred to as a normal operating state, the switch 527 is configured to output AC voltage received from transformer 521 to the electrowetting cell 540; and, in a second state, referred to as a self-healing state, the switch 527 is configured to output DC voltage received from the rectifier circuit 523. The controllable switch 527 includes a transistor 529 coupled to the controller 510 that in response to an AC/DC select signal output by the controller 510 causes the switch 527 to switch from outputting AC voltage to outputting DC voltage to the electrowetting cell 540.

The switchable AC/DC electrical power supply 520 has a third state, referred to as the AC and DC Offset state in which the AC voltage output by the switchable AC/DC electrical power supply 520 is offset, or biased, by a DC voltage supplied by the DC Offset circuit 550.

The controller 510 further includes an analog to digital converter 511 that functions similar to the analog to digital converter 311. The controller 510 includes a processor (described in more detail with reference to a later example) that is configured to interpret the digital signal output by the analog to digital converter 511. As described with reference to the example of FIG. 3, the controller 510 may be configured to determine whether to remain in a normal operating mode or to switch to a self-healing mode based on the digital signal, or to eventually switch to the AC and DC offset mode.

Based on the determination, the controller 510 outputs an AC/DC select signal to the switch 527 indicating the state that the switch 527 is to assume, either AC voltage output or DC voltage output. In an example of when the electrowetting control system 500 is incorporated in an artificial lighting device 590, the controller 510 is controls the operation of the LED light source 555, and is coupled to the LED light source 555. For example, the light source 555 is configured to provide artificially generated light for a general illumination lighting application and the controllable electrowetting device 540 provides beam shaping and/or beam steering functions, as shown by output light being directed to the right at an output of the electrowetting device 540. The LED light source 555 may include an LED driver circuit (not shown in this example) that drives the LED light source in response to light source control signals provided by the controller 510.

The system 500 also includes a separate DC Offset circuit 550 that includes a DC voltage source 524 that supplies a DC voltage in response to a DC enable signal, and a switch 557 that is responsive to a Select DC Offset signal. The DC Offset circuit 550 is configured to supply supplemental DC voltage to the AC voltage output by the switchable AC/DC electrical power supply 520. The supplemental DC voltage thereby biases or offsets the AC voltage supplied to the electrowetting device 540 by the switchable AC/DC electrical power supply 520.

The controller 510 initiates the AC and DC Offset mode by outputting control signals to both the switchable AC/DC electrical power supply 520 and to the DC Offset Circuit 550. For example, the controller 510 outputs the EW control signal to the variable input DC electrical source 524, and a waveform generator control 525 signal to the waveform generator 525. In addition, the controller 510 outputs a DC Offset control signal that controls the variable DC power source 554 of the DC Offset Circuit 550 and a Select DC Offset signal to the LED 559 of switch 557 of the DC Offset Circuit 550.

The variable DC power source 554 generates a DC voltage in accordance with received DC Offset control signal. At typical DC voltage may be approximately 10% of the amplitude of the AC voltage. However, depending upon the parameters of the electrowetting devices, AC/DC power supply and the like, the applied DC voltage may range between approximately 0% to 100% of the AC voltage amplitude. When in the normal operating mode or the self-healing mode, the switch 557 is configured to prevent the variable DC power source 554 from supplying power to the electrowetting device 540. For example, the switch 557 may bypass the DC power source 554 when the controller has not initiated the AC and DC offset mode. However, the AC/DC select signal transistor 529, in response to the AC/DC select signal output by the controller 510, causes the switch 527 to connect to an AC output of the transformer 521 the DC offset voltage output by the DC power supply 554 with the AC voltage output by the switchable AC/DC electrical power supply 520 to the electrodes 542 and 544 of the electrowetting device 540.

A benefit of the supplemental DC voltage when applied to the electrowetting device is that the oxygen ions in the aqueous or water solution liquid are electrically biased and migrate toward the dielectric (not shown in this example) closer to the anode electrode 542. In other words, the addition of the DC offset voltage to the AC voltage supplied to the electrowetting device 540 causes a weak electrolysis reaction with a buildup of electrical charge to occur within the electrowetting device 540. The net buildup of electrical charge adversely affects performance of the electrowetting cell. Hence, the DC offset is not applied continuously.

Figure 6:
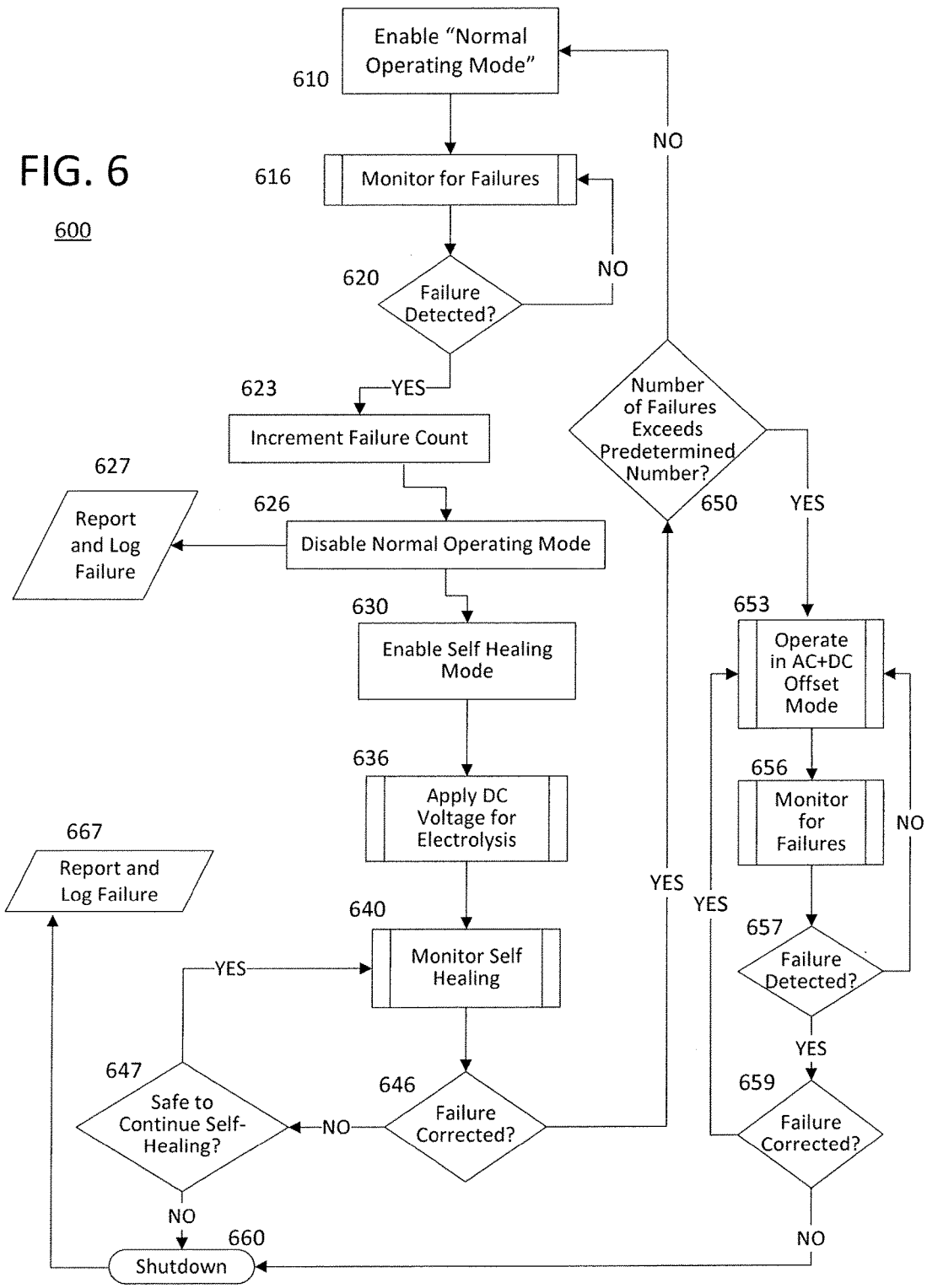
FIG. 6 is a flowchart of an example of another control process for a self-healing electrowetting control system, such as the control system of FIG. 5.

With the structure of the system 500 described above, an operational example of the system 500 will be provided with reference to FIG. 5 and the flowchart of FIG. 6.

FIG. 6 is a flowchart of another example of a control process for a self-healing electrowetting system. The control process of FIG. 6 utilizes a combined AC and DC offset voltage mode in certain situations, and will be described with reference to the system 500 of FIG. 5. For example, the process 600 begins in the normal operating mode (610) during which an AC voltage, in response to control signals output by the controller 510 is applied by an switchable AC/DC electrical power supply 520 described in more detail with reference to FIG. 6 example above to the control the electrowetting device 540. During operation in the normal operating mode, the electrowetting device 540 is monitored, at 616, for failures in the same manner as described above with reference to element 430 of FIG. 4. If no failures are detected at 620 (i.e., NO), the process 600 returns to monitoring failures at 616. However, if a failure is detected at 620 (i.e., YES), the controller increments a failure counter that maintains a count of failures. The electrowetting device 540 may also have an identifier associated with it, and by storing the number of failures in a memory (shown in a later example), the controller 510 may be configured to track the number of failures for multiple electrowetting devices that the controller 510 may control.

At this time, if may be appropriate to note different control configurations for multiple electrowetting devices implemented in an electrowetting device array. The controller may control a single channel driver for driving multiple electrowetting devices. Or alternatively, each electrowetting device may have an individual driver on multiple channels. However, in order to determine which individual electrowetting device experienced a failure, the controller is coupled to a monitoring circuit corresponding to each individual electrowetting device to determine which individual electrowetting device has failed.

Otherwise, a single monitoring circuit would only be able to indicate that there was a failure somewhere within the electrowetting device array containing multiple electrowetting devices.

Returning to the example of FIG. 6, after incrementing the failure count at 623, the process continues to 626. At 626, the controller in response to detection of a failure at 620 deactivates AC power, for example, by stopping output of the AC/DC select signal that indicated the selection of an AC voltage for output from a switch, such as switch 327. In response to the failure detection, the controller generates, at 627, a report and logs the failure in a data structure. For example, the controller, such as 510, may in response to the detection of the failure, increment a count of the number of failures.

The controller may additionally respond to the failure detection by outputting a control signal, such as a different AC/DC Select signal causing the switch 527 to switch from outputting AC voltage to outputting a DC voltage, and thereby enabling self-healing mode (630). The switchable AC/DC electrical power supply 520 in response to the different AC/DC Select control signal begins outputting DC voltage, which in turn begins an electrolysis reaction in the electrowetting device 540 (636). In response to the applied DC voltage, the monitoring circuit 530 detects an operating characteristic of the switchable AC/DC electrical power supply 520 that indicates a progress of the self-healing of the dielectric of the electrowetting device. For example, the monitoring circuit 530 may output a voltage different from the voltage detected that indicated the presence of a failure in the normal operating mode at step 620, the different voltage indicating an initial status of the self-healing process.

At 640, the controller monitors the self-healing. For example, the voltage output by the monitoring circuit 530 may decrease over time to a steady-state voltage. At 646, the process 600 determines whether the failure has been corrected and self-healing is complete. For example, the controller 510 may compare the digital value (obtained via analog-to-digital converter 511) of the steady-state voltage output by the monitoring circuit 530 to digital reference values stored in memory. The digital reference values may be threshold values are used in the comparison to determine whether the self-healing mode was successful, or not. For example, a digital value indicating that approximately zero (0) microamperes ($\mu A$) are being drawn by the electrowetting device 540 may be an indicator of a successful self-healing process and correction of the failure. If the electrowetting device is not repaired (i.e., the failure is not corrected) and the self-healing mode was unsuccessful (i.e., NO at 646), the process 600 proceeds to 647 to determine whether it is safe to continue self-healing.

At 647, the controller 510 may determine that is it would be unsafe to continue with self-healing, if, for example, the controller 510 determined that there were no changes to the voltages received from the monitoring circuit 530 during the self-healing mode (i.e., the current drawn by the electrowetting device 540 was not decreasing). Another condition that may indicate unsafe operation may be a further increase beyond values that initially indicated the failure of the electrowetting device 540 in the subsequent voltages received from the monitoring circuit 530. If the result of the determination at 647 is that operation in the self-healing mode should continue (i.e., YES), the process 600 returns to 640 and continues monitoring the self-healing. Conversely, if the determination at 647 results in a NO, self-healing should be discontinued determination, the process 600 proceeds to 660 where all electrical power delivered to the particular electrowetting device 540 is disabled. Based on these actions and determinations, the controller 510 may generate, at 667, a report and log a failure in a data structure stored in a memory.

The discussion will now return to step 646 to explain the process when the determination at 646 is that self-healing is complete. Upon determining that the electrowetting device 540 was repaired during the self-healing mode (i.e., YES at 646), the process 600 proceeds to 650. At 650, the controller 510 determines whether the count of the number of failures exceeds a predetermined number of allowed failures (i.e., a threshold number) of allowed failures. For example, information based experience, history or electrowetting device manufacturer's specifications may provide information regarding the particular electrowetting device's ability to withstand failures, particularly failures related to the dielectrics, as well as the device's ability to withstand self-healing processes may be used as, or to determine an expected number of failures that can be healed for a specific type or class of electrowetting device. The predetermined number of failures may be, for example, 5, 10, 100 or the like. Upon determining at 650 that the number of failures does not exceed the predetermined number (i.e., NO at 650), the process 600 returns to step 610 and enables the normal operating mode. Alternatively, if the determination is the number of failures exceeds the predetermined number of failures (i.e., YES at 650), the process 600 proceeds to 653. Alternatively, the mean time between failures or other methods may be used to determine when the process 600 proceeds to 653.

At 653, in response to the determination that the number of failures exceeds the predetermined number of failures, the controller initiates operation of the system 500 in the AC and DC Offset mode. The AC and DC offset mode as explained above with reference to FIG. 5 is the application of an AC voltage with a DC offset applied to the electrowetting device 540. One reason for entering the AC and DC Offset mode at this time is to attempt to extend the useable life of the electrowetting device 540 at the cost of reduced performance of the electrowetting device 540, such as reduced fine control of the angle of the fluid interfaces between the fluids, lag in response times of the electrowetting device, or the like. After implementing the AC and DC Offset mode, the controller 510 continues to monitor for failures at 657. If NO failures are detected at 657, the system continues operating in AC and DC Offset mode. However, if a failure is detected at 657 (i.e., YES), the process 600 proceeds to 659 where the controller 510 determines whether the failure has been corrected. The determination of whether the failure has been corrected may be made by the controller 510 based on the voltages provided by the monitoring circuit 530 to the controller 510. If the controller 510 determines that YES, the failure has been corrected, the process 600 returns to 653 and the electrowetting device is driven in the AC and DC Offset mode. Alternatively, if the failure is not corrected, the process 600 proceeds to 660 where, as mentioned above, all electrical power delivered to the particular electrowetting device 540 is disabled. Based on these actions and determinations, the controller 510 may generate a report and log a failure in a data structure stored in a memory.

The failure reports and logs of not only the process 600 but also those collected during the process 400 of FIG. 4 may be analyzed to determine system operating characteristics and operating characteristic trends. For example, the information may be analyzed by an external server (not shown in this example) to determine thresholds, such as the predetermined number of failures, a time period for determining whether self-healing is complete, or to identify historical trends in voltages output by the monitoring circuit as either the electrowetting device heals or further fails, or the like. For example, the information may be used to determine the duration of the certain period of time that it takes to determine whether the electrowetting device has healed. In addition, the information may also be used to track failures within lots of devices, e.g., lot Jun. 21, 2000, may be tracked to determine whether a recall or other corrective action of a particular lot is necessary. Information may be collected and stored by the controller 510. The healing of the electrowetting device may be dependent upon several factors, such as a magnitude of the DC voltage, a size of hole in the dielectric 288, the number of holes in the dielectric 288, or the like.

While the monitor circuits, such as 330 and 530 were shown coupled to the switchable AC/DC power supply, the monitor circuit may be replaced by, or supplemented with, an additional sensor located within the electrowetting device that provides additional information based on the level of H+ and O− ion concentrations that may be indicative of a change in the operated characteristics of the electrowetting device. Such indications may be used by the controller to determine whether a failure has occurred with the electrowetting device.

Figure 7:
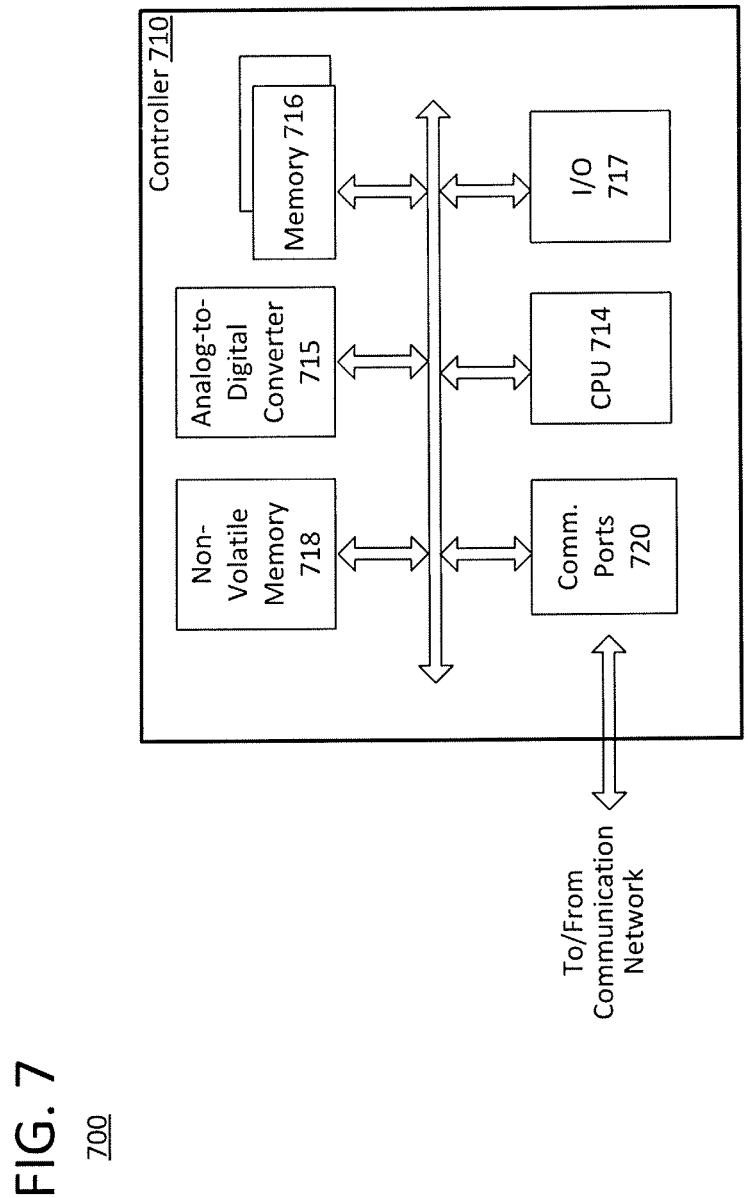
FIG. 7 is a high-level functional block diagram of functional components of a controller, such as that described in the examples of FIGS. 2-6.

FIG. 7 is a high-level functional block diagram of an example of a controller usable with self-healing electrowetting system, for example, in a lighting device, a system or an apparatus.

The controller 710 may, for example, be configured as described above with reference to controllers 210, 310 and/or 510. The controller 710 may perform similar functions as described above as well as additional functions as described in more detail below. The controller 710 includes a central processing unit (CPU) 714, a memory 716, a non-volatile memory 718, communication ports 720 and various input and output (I/O) terminals/connections 717. The various I/O terminals and connections may couple to the monitoring circuit 730, the power supply 720, the electrowetting device 708, the light source 707, if present, the DC offset power supply 721, if present, or the like. The communication ports 720 may provide communication with external networks and/or other devices.

The controller 710 may be configured to control lighting related operations (e.g., ON/OFF, intensity, brightness) of any one or more of lighting sources, such as 355 or 555. Similarly, the controller 710 as described above is configured to control the electrowetting device, such as 240 of FIG. 2 or 340 of FIG. 3.

The processor 714 controls all operations of the electrowetting (and lighting) control system as described with reference to FIGS. 2-6 in accordance with programming that it executes, for all normal operations, and for operations involved in the intelligent electrowetting self-healing process under consideration here. For example, the processor 714 is configured to interpret the meaning of a digital signal output by an analog to digital converter to determine whether the electrowetting device described in the examples of FIGS. 2-6 is experiencing a failure, has successfully healed in response to the self-healing mode, or that the self-healing mode has been unsuccessful.

As used herein, a processor is a hardware circuit having elements structured and arranged to perform one or more processing functions, typically various data processing functions. Although discrete logic components could be used, the examples utilize components forming a programmable central processing unit (CPU). A processor for example includes one or more integrated circuit (IC) chips incorporating the electronic elements to perform the functions of the CPU. The processor 714, for example, may be based on any known or available microprocessor architecture, such as a Reduced Instruction Set Computing (RISC) using ARM architecture, as commonly used today in mobile devices and other portable electronic devices. Of course, other microprocessor circuitry may be used to form the CPU or processor hardware in server computers or other user terminal computer equipment.

The processor 714 also, for example, executes programming or instructions to configure the systems to perform various operations. For example, such operations may include various general operations (e.g., a clock function, recording and logging failure information, controlling lighting, controlling beam steering and beam shaping of output light, and the like) of a lighting device incorporating an electrowetting device as described in the examples of FIGS. 2-6. Although a processor may be configured by use of hardwired logic, typical processors in lighting devices are general processing circuits configured by execution of programming.

Controller 710 includes a memory (volatile 716 and non-volatile 718) and a central processing unit (CPU) 714. The memory 718 may include programming, which may be firmware, that configures the CPU 714 to perform electrowetting control operations, lighting control operations and diagnostic operations.

The programming in the memory 716 also configures the CPU (processor) 714 to control communications of the system over wired or wireless communication devices via communication ports 720. For example, the memory 716 may include values configured to interpret the digital signal output by the analog to digital converter 715.

Hence, aspects of the methods of enabling self-healing of an electrowetting device outlined above may be embodied in programming, for a controller for use with the electrowetting device. Program aspects of the technology may be thought of as "products" or "articles of manufacture" typically in the form of executable code and/or associated data (e.g. operating characteristic values, waveform generation signal parameters, failure counts, log information, and electrowetting device related information and/or files containing such information) that is carried on or embodied in a type of machine readable medium. "Storage" type media include any or all of the tangible memory of the lighting devices, computers, processors or the like, or associated modules thereof, such as various semiconductor memories, disk drives and the like, which may provide non-transitory storage at any time for the software programming. All or portions of the software may at times be communicated through the Internet or various other data communication networks. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software, e.g. the programming and/or data. As used herein, unless restricted to non-transitory, tangible "storage" media, terms such as computer or machine "readable medium" refer to any medium that participates in providing instructions to a processor or the like for execution or in providing data (e.g. configuration information) to a processor or the like for data processing.

Hence, a machine readable medium may take many forms, including but not limited to, a non-transitory or tangible storage medium, a carrier wave medium or physical transmission medium. Non-volatile storage media include, for example, optical or magnetic disks, such as any of the storage devices in any computer(s) or the like, such as may be used to implement the intelligent self-healing electrowetting device, or the store server, or the user terminals, etc. shown in the drawings. Volatile storage media include dynamic memory, such as main memory of such a computer platform or other processor controlled device. Tangible transmission media include coaxial cables; copper wire and fiber optics, including the wires that comprise a bus within a computer system or the like. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a processor, a computer or other machine can read programming code and/or data. Many of these forms of computer readable media may be involved in carrying one or more sequences of one or more instructions to a processor for execution.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A control system, comprising:
   a switchable alternating current/direct current (AC/DC) electrical power supply selectively switchable between providing AC electrical power and DC electrical power to an electrowetting device;
   a monitoring circuit coupled to the switchable AC/DC electrical power supply, the monitoring circuit configured to output a signal relative to an operating characteristic of the AC/DC electrical power supply, wherein the operating characteristic changes based on an operating status of the electrowetting device; and a controller coupled to the monitoring circuit and the switchable AC/DC electrical power supply that switches the AC/DC electrical power supply to outputting DC power in response to a signal from the monitoring circuit generated in reaction to a change in the operating characteristic of the AC/DC electrical power supply, wherein the change in the operating characteristic of the AC/DC electrical power supply caused by a failure in a dielectric of the electrowetting device.

2. The system of claim 1, wherein the switchable AC/DC electrical power supply comprises:
a variable input DC electrical source responsive to control signals from the controller, the variable input DC electrical source coupled to the monitoring circuit;
a waveform generator coupled to the variable input DC electrical source and the controller, the waveform generator outputting variable AC electrical power based on waveform control signals received from the controller and a DC input received from the DC electrical source;
a transformer coupled to the waveform generator that transforms an AC electrical signal generated by the waveform generator into a transformed AC electrical power;
a rectifier circuit coupled to receive the transformed AC electrical power from the transformer and configured to rectify the transformed AC electrical power; and
a controllable switch coupled to an output of the transformer and to an output of the rectifier, the controllable switch configured to selectively connect one of the output of the transformer and the output of the rectifier to electrodes of the electrowetting device in response to a signal from the controller.

3. The system of claim 1, wherein the monitoring circuit comprises:
a voltage source coupled to output a voltage in response to an increase in current output by the switchable AC/DC electrical power supply,
wherein the increase in current output is the operating characteristic of the switchable AC/DC electrical power supply.

4. The system of claim 3, wherein the monitoring circuit further comprises:
an amplifier for amplifying the voltage output by the voltage source.

5. The system of claim 1, wherein the controller comprises:
an analog to digital converter, the analog to digital converter coupled to the monitoring circuit,
wherein an analog output from the monitoring circuit is converted to a digital output, wherein the digital output is indicative of an amount of failure of the dielectric of the electrowetting device.

6. The system of claim 1, further comprising:
an electrowetting device fluidically sealed and having an interior space, the electrowetting device comprising:
a first fluid having a first index of refraction;
a second fluid having a second index of refraction different from the first index of refraction, wherein:
the first and second fluids are within the interior space of the electrowetting device,
the first and second fluids are immiscible, and
the first fluid is conductive; and
electrodes positioned about the electrowetting device coupled to the first fluid and to the switchable AC/DC electrical power source, wherein the first fluid is responsive to electrical power applied to the electrodes from the switchable AC/DC power supply.

7. The system of claim 1, further comprising:
a variable DC offset power supply coupled to the controller and the switchable AC/DC electrical power supply, the variable DC offset power supply configured to supply a DC power offset to the AC power supplied by the AC/DC electrical power supply to the electrowetting device in response to a DC offset signal from the controller.

8. A self-healing electrowetting system, comprising:
an electrowetting device comprising:
a conductive first fluid having a first index of refraction within an interior of the electrowetting device;
a second fluid having a second index of refraction within the interior space of the electrowetting device, wherein the first fluid is conductive, and the first and second fluids are immiscible; and
a dielectric;
an anode associated with the dielectric; and
a cathode;
a switchable alternating current/direct current (AC/DC) power supply coupled to the anode and cathode of the electrowetting device, and configured to selectively switch between providing AC power and DC power to the electrowetting device in response to a control signal, the switchable AC/DC power supply having an operating characteristic indicating a normal operation of the electrowetting device;
a monitoring circuit coupled to the switchable AC/DC electrical power supply, the monitoring circuit configured to detect a change of the operating characteristic of the AC/DC electrical power supply, wherein the change in operating characteristic is in response to a failure of the dielectric of the electrowetting device ; and
a controller coupled to the monitoring circuit and the switchable AC/DC electrical power supply, the controller configured to:
in response to receiving a signal from the monitoring circuit indicating the change in the AC/DC electrical power supply operating characteristic, switch the AC/DC electrical power supply from outputting AC power to outputting DC power to the electrowetting device to repair the degraded dielectric;
determine the failure has been corrected; and
after determining the failure has been corrected, switch the AC/DC electrical power supply from outputting DC power to outputting AC power to the electrowetting device.

9. The self-healing electrowetting system of claim 8, wherein the monitoring circuit is configured to detect a change in current output by the AC/DC electrical power supply in response to the failure of the dielectric of the electrowetting device.

10. The self-healing electrowetting system of claim 8, wherein the monitoring circuit comprises:
a voltage source coupled to output a voltage in response to an increase in current output by the switchable AC/DC electrical power supply; and
an amplifier for amplifying the voltage output by the voltage source, wherein the increase in current output is the operating characteristic of the AC/DC electrical power supply.

11. The self-healing electrowetting system of claim 8, further comprising:

a variable DC offset power supply coupled to the controller and the switchable AC/DC electrical power supply, the variable DC offset power supply configured to supply, in response to a DC offset signal from the controller, a DC power offset to the AC power supplied by the AC/DC electrical power supply to the electrowetting device.

12. The self-healing electrowetting system of claim 8, wherein the controller further comprises an analog-to-digital converter coupled to the monitoring circuit.

13. The self-healing electrowetting system of claim 8, wherein the controller is further configured to:
   in response to receiving a signal from the monitoring circuit indicating the failure of the dielectric is repaired, switching the AC/DC electrical power supply to output AC power to the electrowetting device according to a beam steering and/or shaping signal.

14. The self-healing electrowetting system of claim 8, wherein the controller is further configured to:
   control operation of the light source and in normal operation of the electrowetting device, cause the electrical power supply to apply a voltage to the anode and cathode of the electrowetting device to control a shape of a fluid interface between the first and second fluids.

15. A method of controlling a self-healing electrowetting system, comprising:
   enabling, by a controller, a normal operating mode for the electrowetting system, the normal operating mode including supplying AC power to an electrowetting device of the electrowetting system;
   monitoring the electrowetting device for a failure related to the electrowetting device;
   in response to a detection of a failure, disabling normal operating mode by stopping the supply of AC power to the electrowetting device;
   enabling a self-healing mode by supplying DC power to the electrowetting device, wherein the DC power causes an electrolysis reaction within the electrowetting device;
   monitoring the self-healing mode by determining whether the failure has been corrected;
   in response to a determination that the failure has been corrected by the electrolysis reaction within the electrowetting device, disabling the self-healing mode; and
   re-enabling the normal operating mode by supplying AC power to the electrowetting device.

16. The method of claim 15, further comprising:
   in response to the detection of the failure, incrementing a count of the number of failures;
   determining whether the count of the number of failures exceeds a threshold number of allowed failures; and
   in response to a determination that the count exceeds the threshold number of allowed failures:
      generating a report of the number of failures, wherein the report includes an identifier of the electrowetting device, and
      disabling both AC and DC power to the identified electrowetting device to avoid catastrophic failure of the electrowetting device.

17. The method of claim 15, further comprising:
   in response to the detection of the failure, incrementing a count of the number of failures;
   determining whether the count of the number of failures exceeds a threshold number of allowed failures;
   in response to a determination that the count is below the threshold number of allowed failures, enabling a DC offset mode by applying a DC offset to the AC power supplied to the electrowetting device wherein the power applied to the electrowetting device includes both AC and DC components.

18. The method of claim 17, further comprising:
   monitoring the DC offset mode for an additional failure;
   in response to a determination that an additional failure has occurred, determining whether the failure has been corrected; and
   in response to the determination that the failure has been corrected, continuing operation of the AC and DC offset mode.

19. The method of claim 17, further comprising:
   monitoring the DC offset mode for an additional failure;
   in response to a determination that an additional failure has occurred, determining whether the failure has been corrected;
   in response to the determination that the failure has not been corrected, disable operation of the DC offset mode, and
   generating a report of the number of failures.

20. The method of claim 17, wherein the generated report includes an identifier of the electrowetting device.

21. A lighting device, comprising:
   a light source;
   an electrowetting device coupled to the light source, and configured to process light output by the light source, the electrowetting device comprising:
      a conductive first fluid having a first index of refraction within an interior of the electrowetting device;
      a second fluid having a second index of refraction within the interior space of the electrowetting device, wherein the first and second fluids are immiscible;
      a dielectric;
      an anode associated with the dielectric; and
      a cathode;
   a switchable alternating current/direct current (AC/DC) power supply coupled to the anode and cathode of the electrowetting device, and configured to selectively switch between providing AC power and DC power to the electrowetting device in response to a control signal, the switchable AC/DC power supply having an operating characteristic indicating a normal operation of the electrowetting device;
   a monitoring circuit coupled to the switchable AC/DC electrical power supply, the monitoring circuit configured to detect a change of the operating characteristic of the AC/DC electrical power supply, wherein the changed operating characteristic is in response to a failure of the dielectric of the electrowetting device ; and
   a controller coupled to the light source, the monitoring circuit and the switchable AC/DC electrical power supply, the controller configured to:
      control operation of the light source and in normal operation of the electrowetting device, cause the electrical power supply to apply a voltage to the anode and cathode of the electrowetting device to control a shape of a fluid interface between the first and second fluids;
      in response to receiving a signal from the monitoring circuit indicating the change in the AC/DC electrical power supply operating characteristic, switch the AC/DC electrical power supply from outputting AC power to outputting DC power to the electrowetting device to repair the failed dielectric; and
      In response to a determination the failure has been corrected, switch the AC/DC electrical power supply from outputting DC power to outputting AC power to the electrowetting device.

22. The lighting device of claim 21, further comprising:
a communication interface coupled to the controller and to a communication network;
  wherein the controller is further configured to:
    maintain a count of a number of times the switchable power supply is switched from outputting AC power to outputting DC power due to the failed dielectric of the electrowetting device; and
    in response to the count exceeding a predetermined threshold number, output a notification for transmission via the communication interface to an external processor coupled to the communication network, the notification reporting that the electrowetting device is no longer repairable.

* * * * *